US010368506B2

(12) United States Patent
Neesen et al.

(10) Patent No.: US 10,368,506 B2
(45) **Date of Patent: *Aug. 6, 2019**

(54) CONTROL SYSTEM FOR AN IRRIGATION SYSTEM

(71) Applicant: LINDSAY CORPORATION, Omaha, NE (US)

(72) Inventors: Ward V. Neesen, Omaha, NE (US); Reece Robert Andrews, Arlington, NE (US); Brant Burkey, Denton, NE (US)

(73) Assignee: Lindsay Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/143,913

(22) Filed: Sep. 27, 2018

(65) Prior Publication Data

US 2019/0021246 A1 Jan. 24, 2019

Related U.S. Application Data

(63) Continuation of application No. 15/140,122, filed on Apr. 27, 2016, now Pat. No. 10,085,392, which is a continuation of application No. 13/949,076, filed on Jul. 23, 2013, now Pat. No. 9,408,353.

(51) Int. Cl.

| | |
|---|---|
| ***A01G 25/16*** | (2006.01) |
| ***G06F 3/0484*** | (2013.01) |
| ***G05B 15/02*** | (2006.01) |

(52) U.S. Cl.

CPC ........... *A01G 25/165* (2013.01); *A01G 25/16* (2013.01); *G05B 15/02* (2013.01); *G06F 3/0484* (2013.01); *A01G 25/162* (2013.01); *Y02A 40/237* (2018.01); *Y02A 40/238* (2018.01)

(58) Field of Classification Search

CPC .... A01G 25/165; A01G 25/16; A01G 25/162; G06F 3/0484; G05B 15/02; Y02A 40/237; Y02A 40/238

See application file for complete search history.

(56) References Cited

U.S. PATENT DOCUMENTS

| | | | | |
|---|---|---|---|---|
| 6,823,239 B2 * | 11/2004 | Sieminski | ............ | A01G 25/167 239/69 |
| 7,010,395 B1 * | 3/2006 | Goldberg | .............. | A01G 25/16 700/284 |
| 7,406,363 B2 * | 7/2008 | Doering | .............. | A01G 25/162 700/282 |

(Continued)

*Primary Examiner* — Charles R Kasenge

(74) *Attorney, Agent, or Firm* — Hovey Williams LLP

(57) ABSTRACT

A control system for a low-volume irrigation system includes a plurality of valve controllers for opening and closing valves; an irrigation system controller for controlling the valve controllers in accordance with an irrigation plan; and a graphical user interface for allowing a user to interact with the irrigation controller and to create the irrigation plan. The graphical user interface displays an irrigation zone list, an irrigation set list, and an irrigation plan field. The user interface has drag and drop functionality that permits an irrigation zone listing from the irrigation zone list to be dragged and dropped into any of the irrigation set listings in the irrigation set list and that permits an irrigation zone listing or an irrigation set listing to be dragged and dropped into the irrigation plan to create irrigation steps within the irrigation plan.

20 Claims, 23 Drawing Sheets

(56) References Cited

U.S. PATENT DOCUMENTS

| | | | | |
|---|---|---|---|---|
| 8,209,061 | B2 * | 6/2012 | Palmer | A01G 25/16 239/236 |
| 8,793,024 | B1 * | 7/2014 | Woytowitz | A01G 25/167 137/78.2 |
| 9,192,110 | B2 * | 11/2015 | Standerfer | A01G 25/16 |
| 9,258,952 | B2 * | 2/2016 | Walker | G05B 13/021 |
| 9,408,353 | B2 * | 8/2016 | Neesen | G06F 3/0484 |
| 10,085,392 | B2 * | 10/2018 | Neesen | A01G 25/16 |
| 2002/0002425 | A1 * | 1/2002 | Dossey | G01F 1/44 700/284 |
| 2006/0122735 | A1 * | 6/2006 | Goldberg | A01G 25/16 700/284 |
| 2009/0076660 | A1 * | 3/2009 | Goldberg | A01G 25/16 700/284 |
| 2010/0030389 | A1 * | 2/2010 | Palmer | A01G 25/16 700/284 |
| 2011/0106320 | A1 * | 5/2011 | Hall | A01G 25/16 700/284 |
| 2012/0036091 | A1 * | 2/2012 | Cook | G06Q 50/06 705/412 |
| 2012/0041606 | A1 * | 2/2012 | Standerfer | A01G 25/16 700/284 |
| 2012/0239211 | A1 * | 9/2012 | Walker | A01G 25/16 700/284 |
| 2012/0261487 | A1 * | 10/2012 | Palmer | A01G 25/16 239/63 |
| 2014/0236868 | A1 * | 8/2014 | Cook | A01G 25/16 705/412 |
| 2016/0050860 | A1 * | 2/2016 | Standerfer | A01G 25/16 700/284 |
| 2016/0113220 | A1 * | 4/2016 | Walker | A01G 25/16 700/284 |

* cited by examiner

CONTROL SYSTEM FOR AN IRRIGATION SYSTEM

RELATED APPLICATIONS

This patent application is a continuation, and claims priority benefit with regard to all common subject matter, of earlier-filed U.S. patent application Ser. No. 15/140,122, filed on Apr. 27, 2016, and entitled "CONTROL SYSTEM FOR AN IRRIGATION SYSTEM". Application Ser. No. 15/140,122 is a continuation of earlier-filed U.S. patent application Ser. No. 13/949,076, filed on Jul. 23, 2013, entitled "CONTROL SYSTEM FOR AN IRRIGATION SYSTEM", and issued as U.S. Pat. No. 9,408,353 on Aug. 9, 2016. The identified earlier-filed non-provisional patent applications are hereby incorporated by reference in their entireties into the present application.

BACKGROUND

1. Field

Embodiments of the present invention relate to control systems for irrigation systems. More particularly, embodiments of the invention relate to a graphical user interface that allows users to more quickly and intuitively create and manage irrigation plans for an irrigation system.

2. Related Art

Mechanized irrigation systems are frequently used for irrigating crops and other plants. Unfortunately, with increased irrigation by more and more growers, the amount of water available for irrigation is sometimes limited, especially in drought years when it is most crucial. As a result, water sources in many areas are becoming more tightly regulated and restricted.

Low volume irrigation, also known as drip irrigation, trickle irrigation, micro irrigation, and/or localized irrigation, is an irrigation method that saves water and fertilizer by allowing water to drip or otherwise be delivered slowly to the roots of plants, either onto the soil surface or directly onto the root zone, through a network of valves, pipes, tubing, and/or emitters. Low-volume irrigation systems are becoming increasingly popular because they effectively irrigate crops with the absolute minimum amount of water by delivering water precisely where it is needed and when it is needed.

To optimize their performance and water preservation, users must manage the run time, frequency of operation, and other operational of low-volume irrigation systems. Until recently, users had to do so by walking from valve to valve and manually turning them on or off. Such manual control is tedious, time consuming, and imprecise.

Modern low-volume irrigation systems include control systems that automate many of their operations. Unfortunately, existing control systems require knowledge of confusing and non-intuitive programming and/or controls. Moreover, most known control systems can only be set-up and adjusted at the controller itself, which is typically mounted in a panel near other components of the low-volume irrigation system. Some control systems have remotely accessible user interfaces, but such interfaces typically just mirror the local interfaces and are therefore just as confusing and non-intuitive. Similar problems exist for control systems designed for center pivot irrigation systems, lateral move irrigation systems, and other types of irrigation systems.

SUMMARY

Embodiments of the present invention solve the above-described problems and other problems by providing an improved control system for a low-volume irrigation system. An embodiment of the control system broadly comprises a number of valve controllers for opening and closing valves in an irrigation system; an irrigation system controller for controlling the valve controllers in accordance with irrigation plans; and a remotely accessible graphical user interface for allowing a user to interact with the irrigation system controller and create and/or modify the irrigation plans.

The graphical user interface greatly simplifies the creation, modification, and/or implementation of the irrigation plans. In accordance with one aspect of the invention, the graphical user interface has an irrigation plan editing page that displays an irrigation zone list, an irrigation set list, and an irrigation plan field. The irrigation zone list contains a listing of irrigation zones of the low-volume irrigation system, with each of the zones being controlled by at least one of the valve controllers. For example, if the low-volume irrigation system has four valves and therefore four irrigation zones, the irrigation zone list may include four zone listings, one for each irrigation zone. The information in the zone list may be obtained from the irrigation system controller or may be entered by a user.

The irrigation set list contains a listing of irrigation sets, wherein each irrigation set contains information for at least one irrigation zone. For example, using the four zone irrigation system mentioned above, a first irrigation set may consist of irrigation zones 1 and 2, a second irrigation set may consist of zones 1 and 4; and a third irrigation set may consist of just zone 3. As described in more detail below, a user can create any number of custom designed irrigation sets and subsequently modify them to create custom irrigation plans.

The irrigation plan field displays at least one irrigation plan that may be provided to the irrigation system controller to control operation of the valves in the irrigation system. Each irrigation plan includes information for at least one irrigation zone, at least one irrigation set, and/or at least one "special action" such as a delay or pause period. For example, in one embodiment, each irrigation plan includes a number of steps, with each step including an irrigation set, an irrigation zone, or a special action. Using the four zone irrigation system mentioned above, a first step of the irrigation plan may consist of the first irrigation set, which includes irrigation zones 1 and 2; a second step of the irrigation plan may consist of irrigation zone 3 only; a third step of the irrigation plan may consist of a 10 minute delay or wait period during which all of the irrigation zones are shut off; and a fourth step of the irrigation plan may consist of the second irrigation set, which includes irrigation zones 1 and 4. As described in more detail below, a user can create and subsequently modify any number of custom designed irrigation plans, each with customizable steps containing irrigation zones, irrigation sets, and/or special actions.

In accordance with another important aspect of the invention, the user interface includes functionality that permits an irrigation zone listing from the irrigation zone list to be copied into any of the irrigation set listings. For example, using the four zone irrigation system mentioned above, a user may click-on or otherwise select the zone listing for irrigation zone 1 and drag and drop it into an existing irrigation set or a new irrigation set. This allows a user to quickly and easily create new and/or modify existing irrigation sets from the irrigation zone listings. In alternate embodiments, other user interface methods of copying information may be used instead of drag and drop functionality.

Similarly, the functionality permits an irrigation zone listing from the irrigation zone list or an irrigation set listing from the irrigation set list to be dragged and dropped or otherwise copied into a new or existing irrigation plan to create or modify irrigation steps within the irrigation plan. For example, a user may click-on or otherwise select a second irrigation set listing and drop it into the irrigation plan to become the first step of the plan, click-on or otherwise select zone listing 1 and drop it into the irrigation plan to become the second step of the plan, and then click-on or otherwise select a wait period and drop it into the irrigation plan to become the third step of the plan. This allows a user to quickly and easily create and/or modify an irrigation plan from existing irrigation zone listings and irrigation set listings. In alternate embodiments, other user interface methods of copying information may be used instead of the drag and drop functionality.

The user interface also allows the run time and/or other operating parameters for each step in an irrigation plan to be customized and the steps in the irrigation plan to be re-arranged before or after the plan is fully created. Completed irrigation plans may then be added to a calendar for scheduling operation of the irrigation system.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

Figure 1:
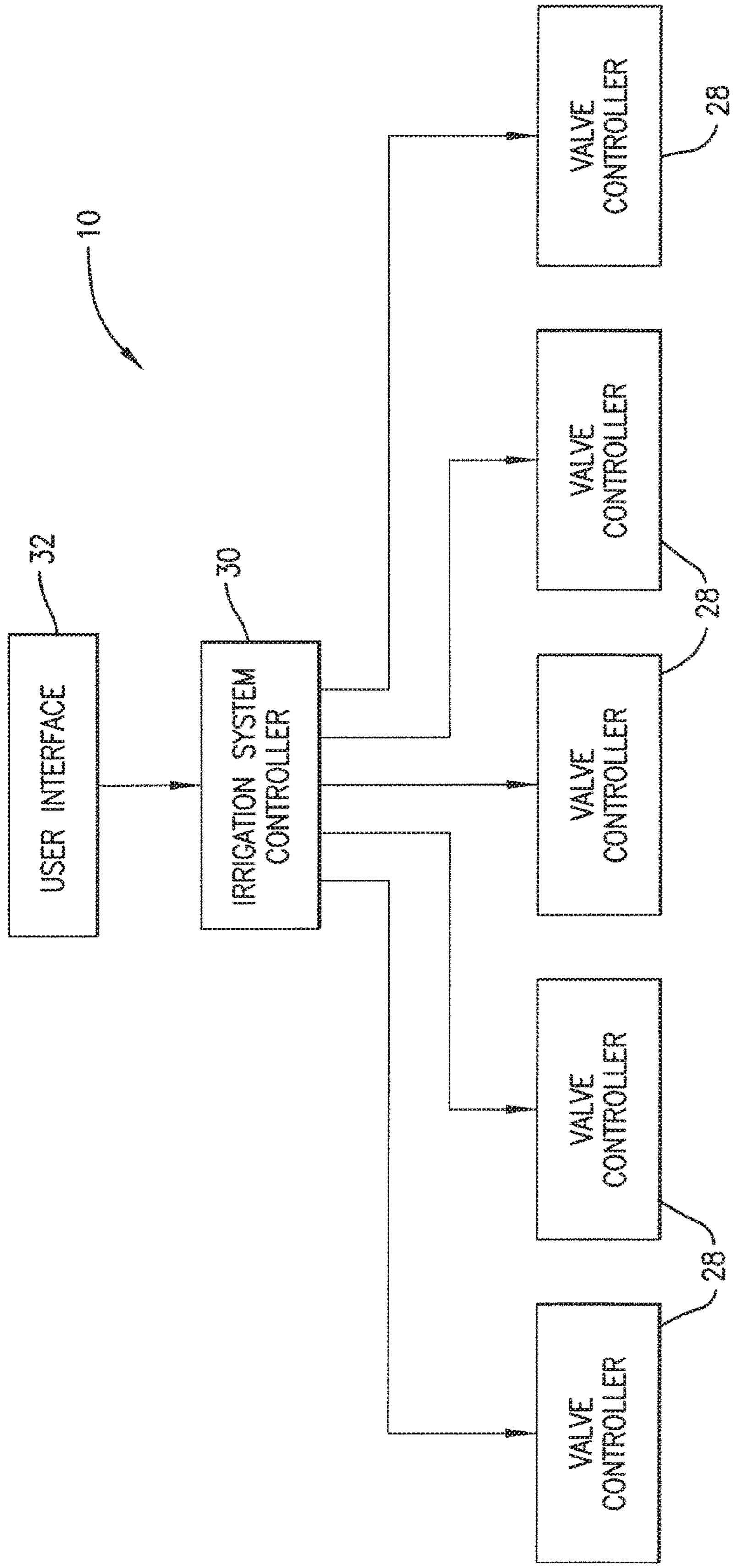
FIG. 1 is a block diagram of a control system constructed in accordance with embodiments of the invention and configured for controlling operation of an irrigation system.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description references the accompanying drawing figures that illustrate specific embodiments in which the invention may be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to “one embodiment”, “an embodiment”, or “embodiments” mean that the feature or features being referred to are included in at least one embodiment of the technology. Separate references to “one embodiment”, “an embodiment”, or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures and initially FIG. 1, an irrigation control system 10 constructed in accordance with embodiments of the invention is illustrated. The control system 10 may be used with any type of low-volume irrigation systems, including, but not limited to drip irrigation systems, trickle irrigation systems, micro irrigation systems, and/or localized irrigation systems. Embodiments of the control system 10 may also be used with center pivot irrigation systems, lateral or linear irrigation systems, and/or other types of irrigation systems.

Figure 2:
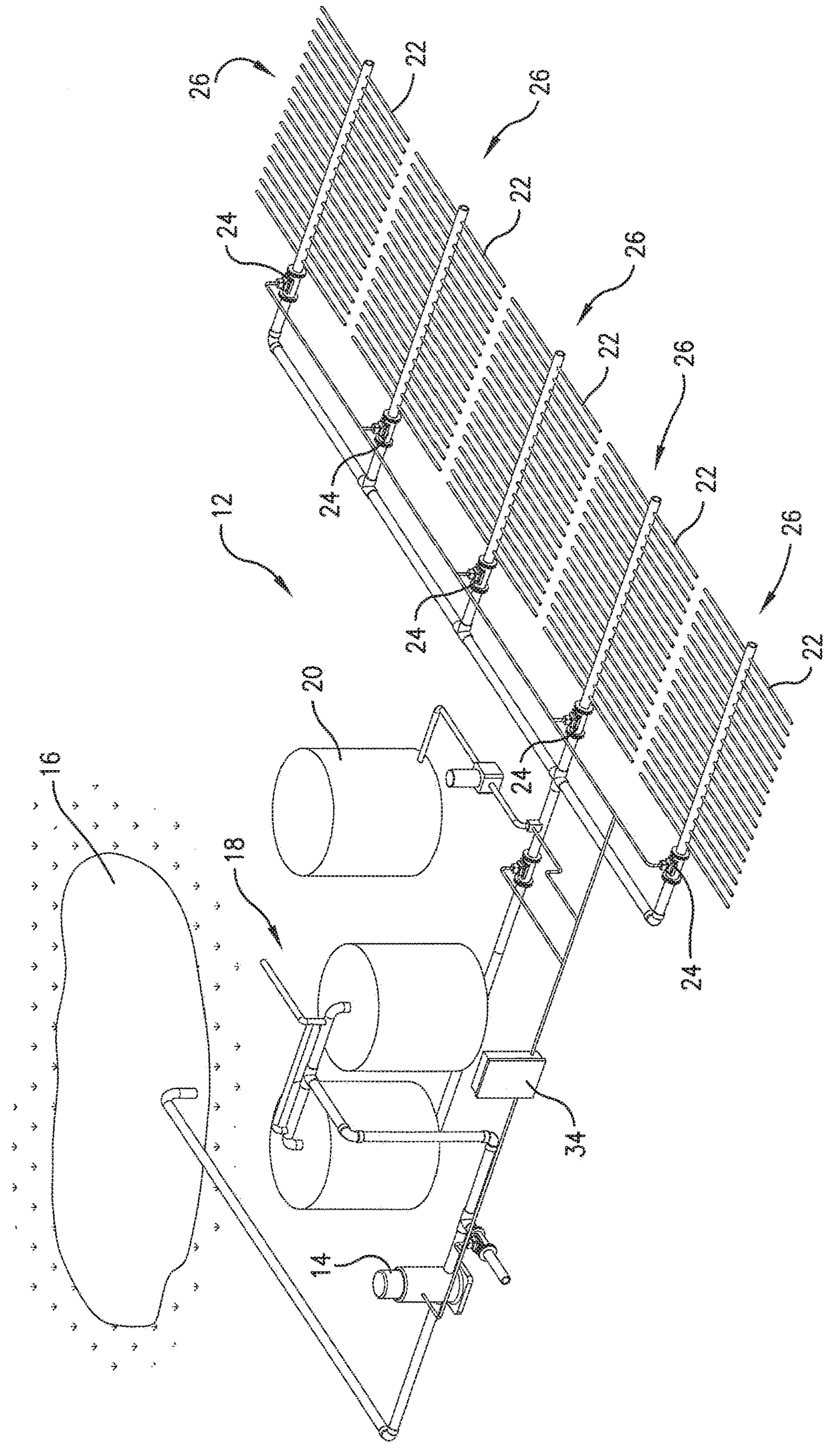
FIG. 2 is a schematic diagram of an exemplary low-volume type irrigation system that may be controlled by the control system of the present invention.

An exemplary irrigation system 12 that may be controlled with the control system 10 is depicted in FIG. 2 and includes one or more pumps 14 or master valves that receive water from a reservoir, river, lake, or other water source 16; a water filtration system 18 that filters the water before it is delivered to irrigated plants; an injector system 20 that may be used to inject fertilizers, pesticides, and/or other substances into the water; a number of water pipes, tubes, hoses, and/or other water emitters 22 that deliver the water to the plants; and a number of valves 24 that control the flow of water to the water emitters 22. The irrigation system 12 may also include water pipes or other fluid-carrying conduits for carrying water between the other components of the system, various check valves, shut-off valves, and other valves, and other components commonly found on irrigation systems.

Each valve 24 and its associated water emitters 22 create an irrigation zone 26. Thus, the illustrated irrigation system 12 includes five irrigation zones, each which may be used for irrigating a distinct area of crops or other plants. Although the illustrated irrigation system 12 only includes one pump, one filtration system, five irrigation zones, etc, any number of these components and zones may be provided, as the specific configuration of the irrigation system 12 is not critical and may vary from one embodiment of the invention to another without departing from the spirit or scope of the present invention.

Returning to FIG. 1, an exemplary embodiment of the control system 10 broadly comprises a number of valve controllers 28 for opening and closing the valves 24; an irrigation system controller 30 for controlling the valve controllers 28 in accordance with one or more irrigation plans; and a remotely accessible graphical user interface 32 for allowing a user to interact with the irrigation system controller 30 and create and subsequently modify the irrigation plans. The control system 10 may also receive irrigation system status information from one or more monitoring devices or systems.

The valve controllers 28 are conventional and may include any devices capable of opening and closing the valves 24 under direction of the irrigation system controller 30. The valve controllers 28 may be hard-wired to the irrigation system controller or may have wirelessly-controlled switches that receive instructions from the irrigation system controller via short range wireless receivers or transceivers. The valve controllers 28 may receive simple open and close type instructions from the irrigation system controller 30 or may have resident memory and controls that can receive and store more detailed instructions for controlling the valves. For example, each valve controller 28 may have memory and date and clock circuitry and may receive, store, and implement a schedule of times to open and close over extended time periods.

The irrigation system controller 30 signals the valve controllers 28 to open or close their respective valves 24 in accordance with one or more irrigation plans as described below. An embodiment of the irrigation system controller 30 may consist of a central control unit and communications circuitry for communicating with the valve controllers. The central control unit may comprise various computing elements, such as integrated circuits, microcontrollers, microprocessors, programmable logic devices, memory, etc, alone or in combination, to perform the operations described herein. The central control unit may also include, or be coupled with, other components, including power components such as batteries, switches, sensors, etc.

The communication circuitry may provide signals to the valve controllers 28 via hard-wired connections or one or more wireless transmitters. The communications circuitry may also include other communications components for communicating with other devices via wires, short range radio transmissions, a cellular phone network, the Internet, and/or other communication methods.

The irrigation system controller 30 may be enclosed in a waterproof housing 34 or otherwise sealed from the environment to protect electrical components that may be damaged by water, dust or sunlight. The housing 34 may be mounted anywhere near the irrigation system, such as near the pump 4 or other components of the low-volume irrigation system 10 as depicted in FIG. 2.

The graphical user interface 32 allows users to interact with the irrigation system controller 30 and create and/or modify irrigation plans for use in controlling the valves 24 as explained in more detail below. As used herein, the term "irrigation plan" encompasses any set of instructions for opening and closing the valves 24 for selected time intervals to selectively irrigate one or more of the irrigation zones 26. For example, an irrigation plan may include an irrigation start time, an irrigation stop time, an irrigation duration, a water application rate, chemical application information, or any combination thereof for one or more of the irrigation zones 26. The control system 10 implements the irrigation plans and communicates control commands to the valve controllers 28 such that the irrigation system 10 operates according to the irrigation plans without the need for a user to manually start, stop or otherwise provide manual commands to the irrigation system 12.

Aspects of the graphical user interface 32 can be implemented in hardware, software, firmware, or a combination thereof. In one exemplary embodiment, the graphical user interface 32 may be implemented in part with a computer program or programs that operate computer and communications equipment broadly referred to by the numeral 36 in FIG. 3. The exemplary computer and communications equipment 36 may include one or more host computers 38 and a plurality of electronic devices 40 that may access the host computers via a communications network 42. The computer programs and equipment illustrated and described herein are merely examples of programs and equipment that may be used to implement embodiments of the invention and may be replaced with other programs and computer equipment without departing from the scope of the invention.

The host computers 38 may serve as repositories for data and programs used to implement certain aspects of the present invention as described in more detail below. The host computers 38 may be any computing devices such as network or server computers and may be connected to a firewall to prevent tampering with information stored on or accessible by the computers. The functionality of the host computers 38 may also be distributed in a cloud computing environment.

One of the host computers 38, may be a device that operates or hosts a website 44 accessible by at least some of the devices 40 and the irrigation system controller 30. The host computer that hosts the website includes conventional web hosting operating software, an Internet connection such as a cable connection, satellite connection, DSL converter, or ISDN converter, and is assigned a URL and corresponding domain name such as "www.lindsay.com" and/or "www.lindsay.mobi" so that the website hosted thereon can be accessed via the Internet in a conventional manner.

The host computers 38 may host and support software and services of proprietary mobile application providers such as Google, Apple, and Blackberry and/or non-proprietary or open platforms.

Although three host computers 18 are described and illustrated herein, embodiments of the invention may use any combination of host computers and/or other computers or equipment. For example, the features and services described herein may be divided between the host computers 18 or may all be implemented with only one of the host computers.

The computer and communications equipment 36 may also include or use a data interchange format device 46 for distinguishing the types of devices (e.g. mobile phone, desktop computer) that attempt to access the host computers 38 and for routing communications and requests to the host computers accordingly.

The electronic devices 40 may be used by any users wishing to view, receive, and/or provide information described herein. The electronic devices 40 may include various types of devices that can access the host computers 38 via the communications network 42. The electronic devices 40 may include, for example, one or more mobile communications devices such as wireless phones manufactured by or for Apple or Blackberry, MP3 devices, handheld game players, or any other wireless communication device. The electronic devices 40 may also include one or more tablet, laptop, personal, or network computers.

Each electronic device 40 may include or have access to a web browser and a conventional Internet connection such as a wireless connection including a Wi-Fi connection or a 3G or 4G connection, a modem, DSL converter, or ISDN converter that permits it to access the Internet. Although FIG. 3 depicts a particular number of electronic devices 40, any number of devices may access the host computers 38.

The communications network 42 is preferably the Internet but may be any other communications network such as a local area network, a wide area network, a wireless network, or an intranet. The communications network may also be a combination of several networks. For example, the electronic devices 40 may wirelessly communicate with a computer or hub via a Wi-Fi network, which in turn is in communication with one or more of the host computers 38 via the Internet or other communication network 42.

The computer programs of the present invention are stored in or on computer-readable medium residing on or accessible by the computer and communications equipment 36 and/or the irrigation system controller 30. The computer programs preferably comprise ordered listings of executable instructions for implementing logical functions in the irrigation system controller 30, the host computers 38 and/or the devices 40. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

Figure 3:
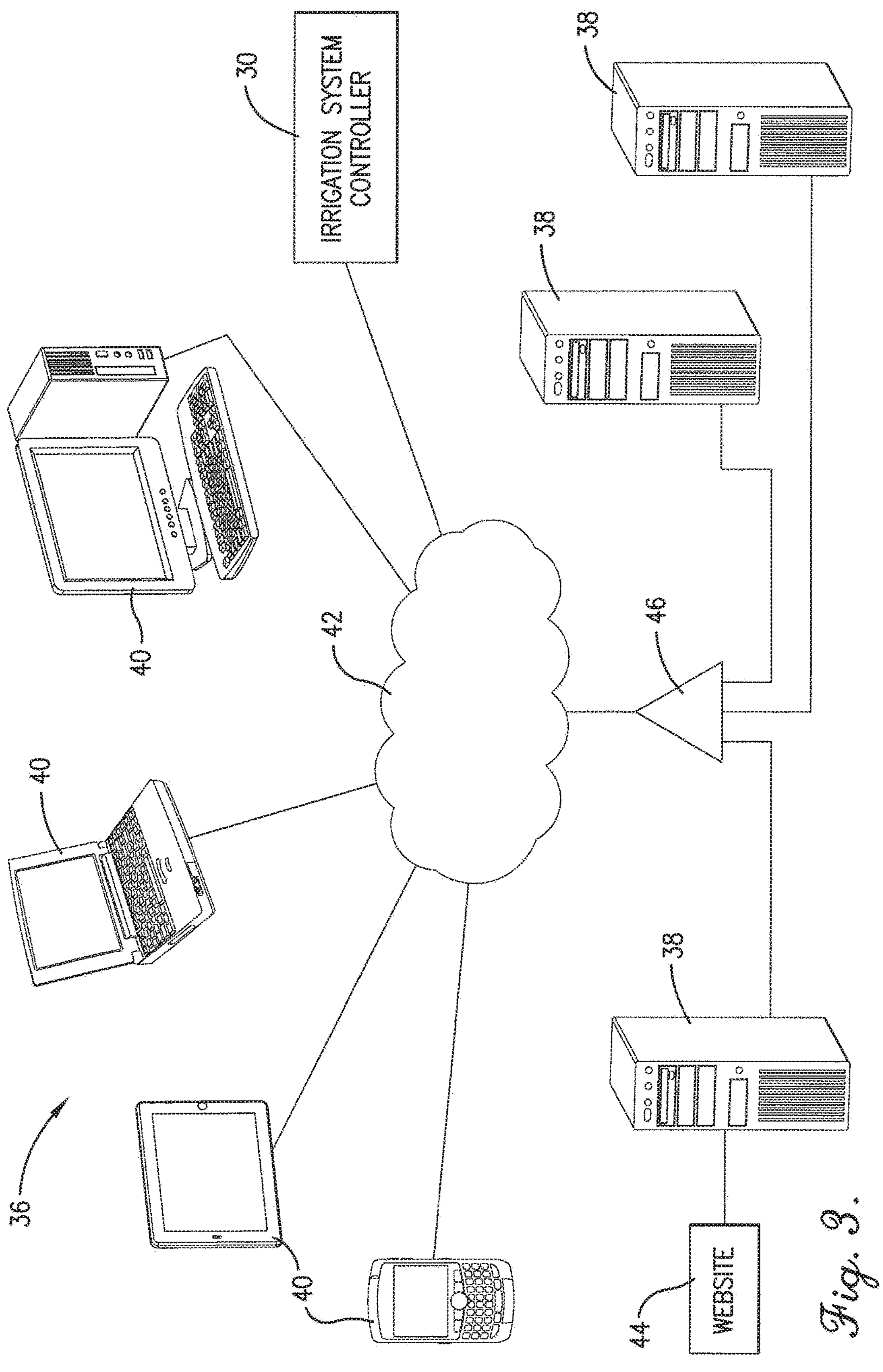
FIG. 3 is a schematic diagram of exemplary computer and communications equipment that may be used to implement the user interface and other aspects of the control system.

The user interface 32 is preferably presented remotely from the irrigation system 12 and is accessible via a computer network such that a user may access it from any device with network access, including the desktop or laptop computers, smartphones, and computer tablet devices 40 illustrated in FIG. 3. By way of example, the user interface 32 may be presented as, or as part of, a webpage defined by a hypertext markup language (HTML) document and presented according to the hypertext transfer protocol (HTTP). The user interface 32 includes the various graphical user interface elements described in detail below as well as other controls, whether mechanical or electronic, that enable the user to interact with the irrigation system controller 30.

Figure 4:
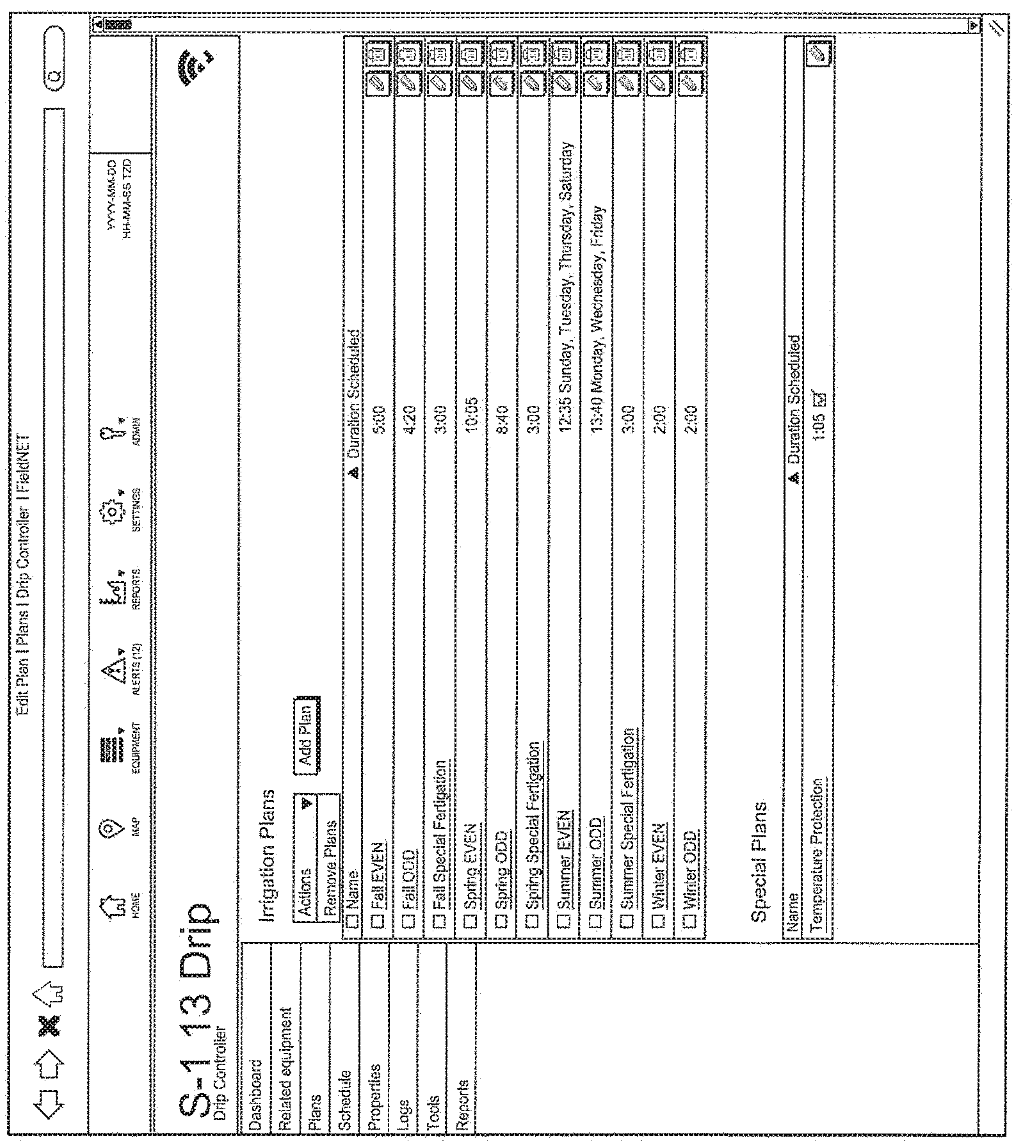
FIG. 4 is an exemplary screen display that may be presented by the graphical user interface.

Exemplary user interface elements are depicted in FIGS. 4-22. FIG. 4 illustrates a user interface page that may list a number of irrigation plans that may be implemented by the irrigation system controller 30. A user may click-on or otherwise select one of the listed irrigation plans to view or modify it. The user interface may also include various graphical elements or icons associated with functions not relevant to the present invention.

Figure 5:
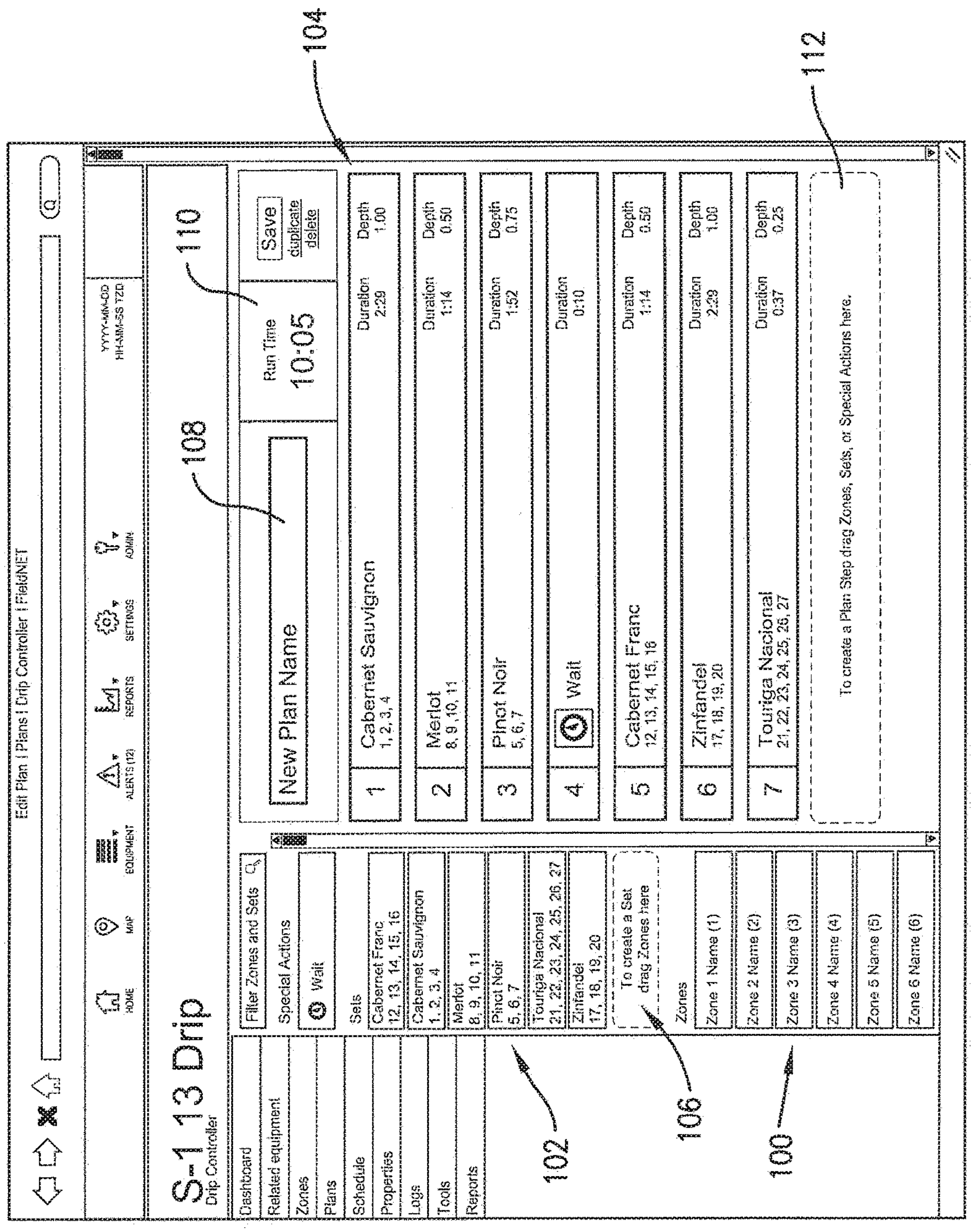
FIG. 5 is another exemplary screen display that may be presented by the graphical user interface.

FIG. 5 illustrates an Edit Plan page of the graphical user interface that may be displayed when a user wishes to edit an existing irrigation plan or create a new one. In accordance with one aspect of the invention, the Edit Plan page displays an irrigation zone list 100, an irrigation set list 102, and an irrigation plan field 104.

The irrigation zone list 100 contains a listing of irrigation zones of the low-volume irrigation system 12, with each of the zones being controlled by at least one of the valve controllers 28. For example, the zone list 100 may have 27 zone listings for a low-volume irrigation system with 27 valves and irrigation zones. Only six zone listings are displayed in FIG. 5, but other zone listings may be seen by operating a scroll bar.

Each zone listing in the zone list 100 is associated with a computer file, directory, or other memory element that stores data or other information for the corresponding zone. For example, the data may include information identifying the corresponding valve and/or zone, a description of the zone, the flow rate for the zone, and maximum valve run time. The information in the zone list may be obtained from any source or may be entered by a user.

The irrigation set list 102 contains a listing of irrigation sets, wherein each irrigation set contains at least one irrigation zone. For example, the first irrigation set called "Cabernet Franc" may consist of zones 12, 13, 14, 15, and 16 and the second irrigation set called "Cabernet Sauvignon" may consist of zones 1, 2, 3, and 4. Each irrigation set listing may be expanded and modified as described below. The irrigation set list 102 also contains a "drag and drop" area 106 to which a zone listing may be dragged and dropped to create a new irrigation set listing as described in more detail below.

The irrigation plan field 104 displays at least one irrigation plan that may be implemented by the irrigation system controller 30 to control operation of the valves 24. Each irrigation plan includes information for at least one irrigation zone or at least one irrigation set. In one embodiment, each irrigation plan may include a number of steps, with each step including an irrigation set, an irrigation zone, or a "special action" such as a wait or pause. For example, the irrigation plan illustrated in FIG. 5 has seven steps, with the first step consisting of the irrigation set called "Cabernet Sauvignon," the second step consisting of the irrigation set called "Merlot," the third step consisting of the irrigation set called "Pinot Noir," the fourth step consisting of a 10 minute Wait period, the fifth step consisting of the irrigation set called "Cabernet Franc," the sixth step consisting of the irrigation set called "Zinfandel," and the seventh step consisting of the irrigation set called "Touriga Nacional."

The irrigation plan field 104 may also include a name field 108 for entering a name for the irrigation plan and a Run Time field 110 for indicating the accumulated run time of all the steps in the irrigation plan. The irrigation plan field 104 also contains a "drag and drop" area 112 to which a zone listing, a set listing, or a special action step may be dragged and dropped to create a new step in the irrigation plan as described in more detail below.

Figure 6:
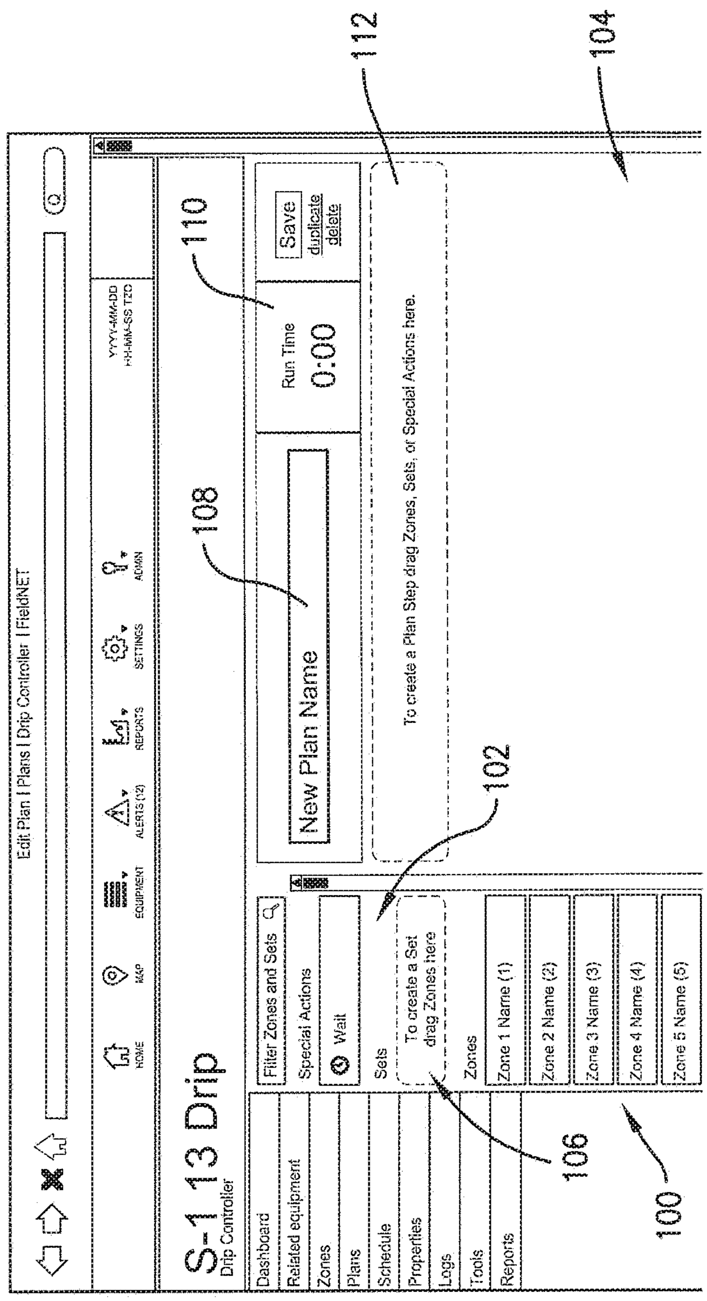
FIG. 6 is another exemplary screen display that may be presented by the graphical user interface.
Figure 7:
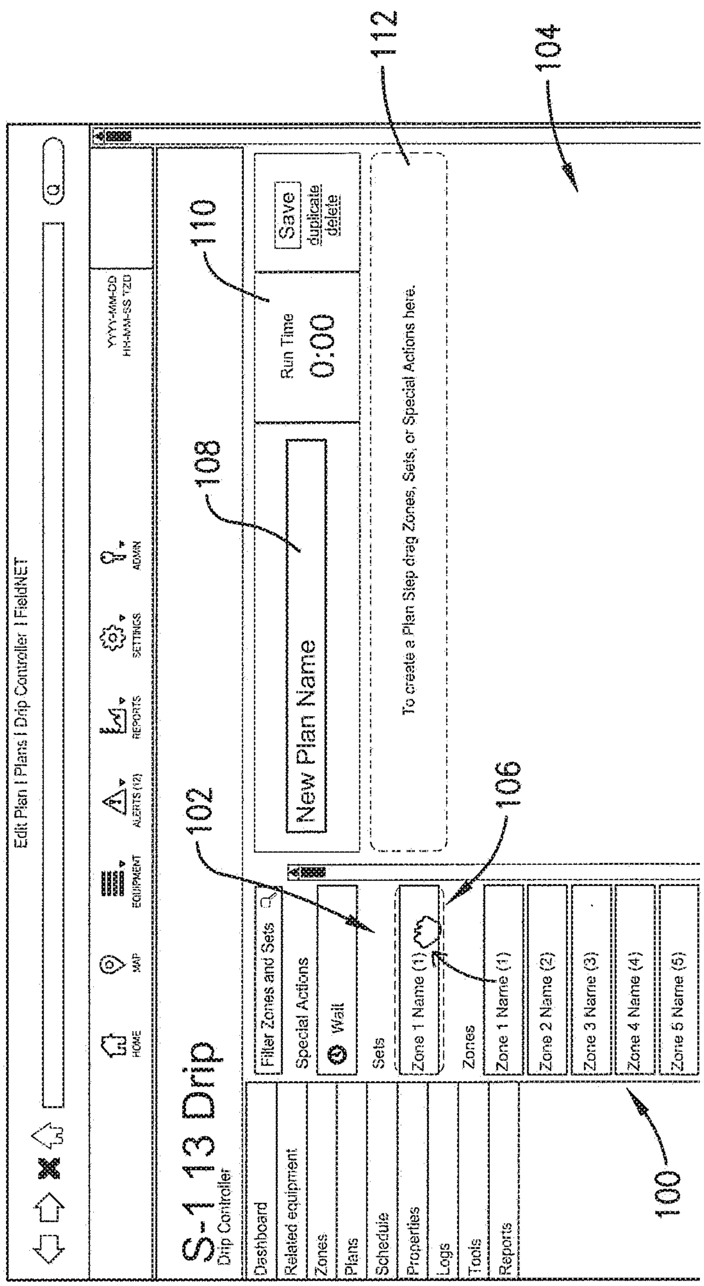
FIG. 7 is another exemplary screen display that may be presented by the graphical user interface.
Figure 8:
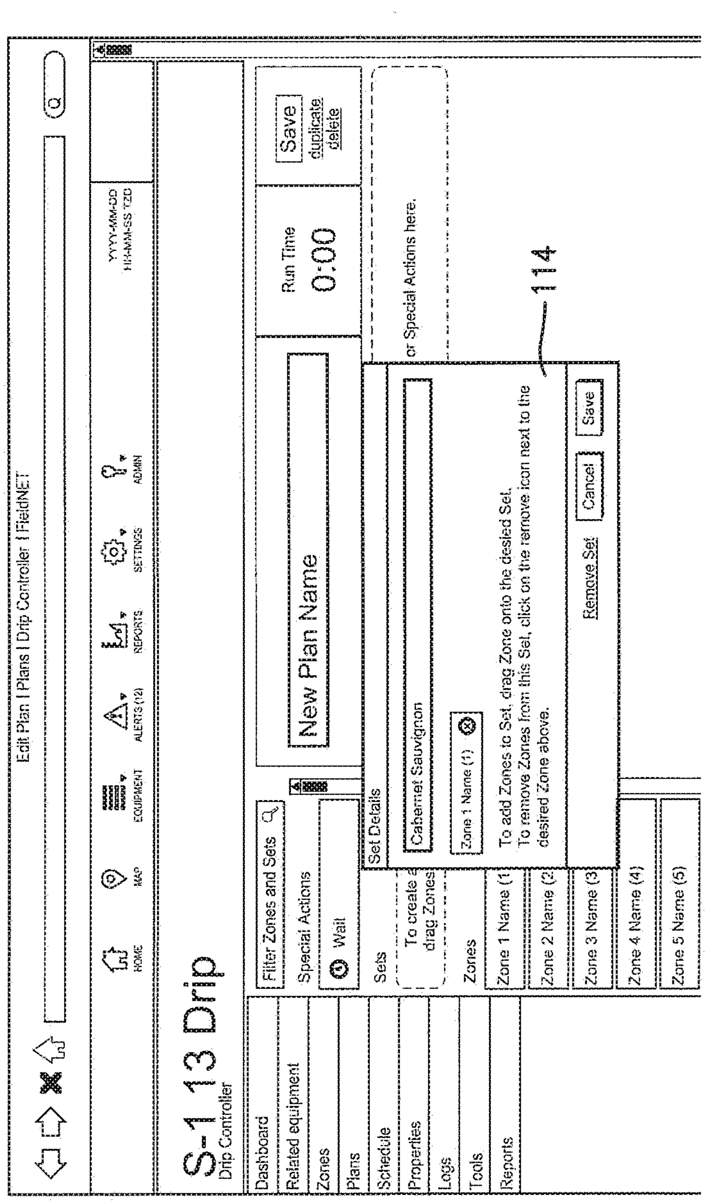
FIG. 8 is another exemplary screen display that may be presented by the graphical user interface.
Figure 9:
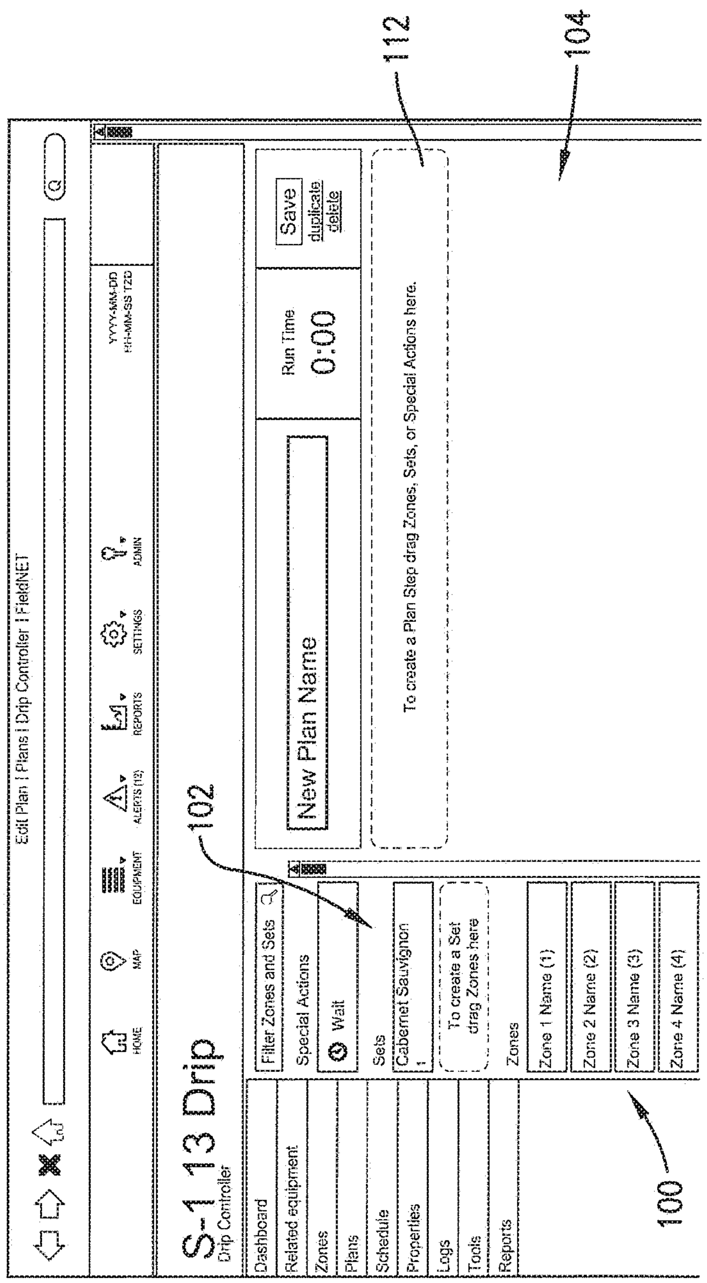
FIG. 9 is another exemplary screen display that may be presented by the graphical user interface.

In accordance with another important aspect of the invention, embodiments of the user interface include drag and drop functionality that permits an irrigation zone listing from the irrigation zone list 100 to be dragged and dropped into the irrigation set list 102. For example, as depicted in FIGS. 6 and 7, a user may click-on or otherwise select a zone listing from the zone list 100 and drag it into the drag and drop area 106 of the irrigation set listing 102 to create a new irrigation set. Upon releasing the zone listing in the drag and drop area 106, the user interface displays a dialog box 114 depicted in FIG. 8 that permits the user to name and then save the new irrigation set. In the illustrated example, the user names the irrigation set "Cabernet Savignon" and then saves it so that it is listed in the irrigation set list 102 as shown in FIG. 9.

Figure 10:
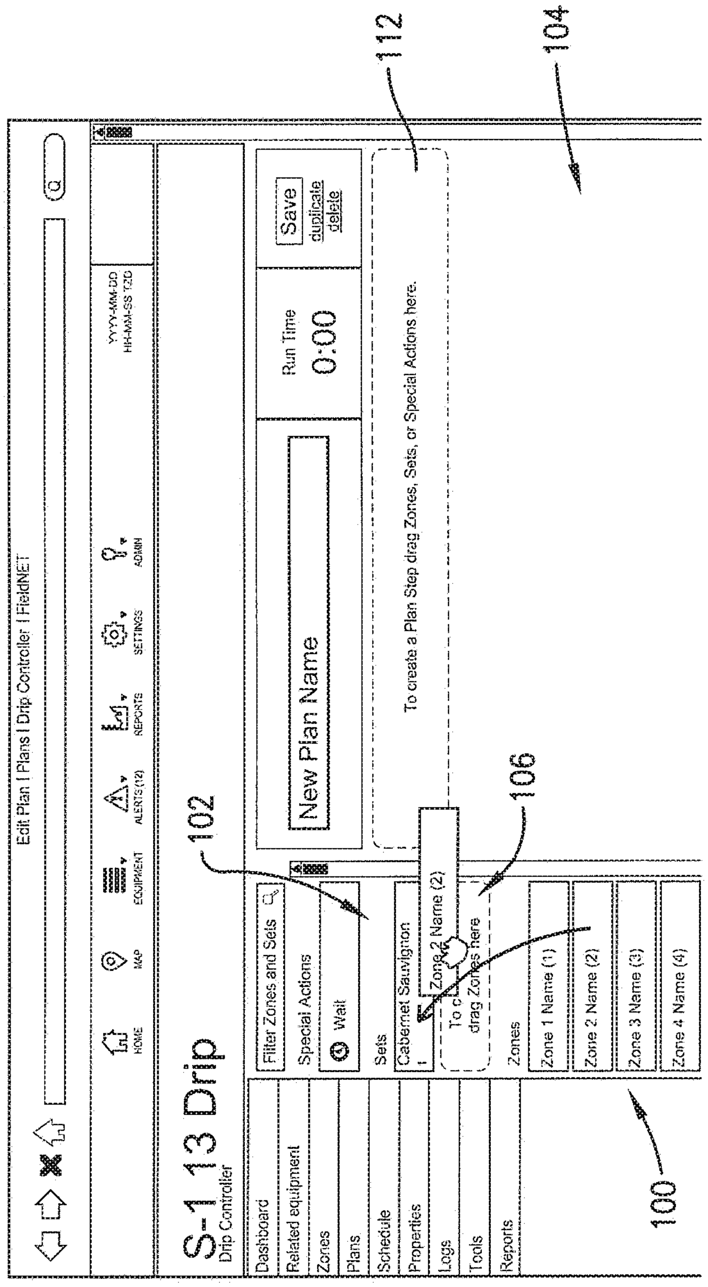
FIG. 10 is another exemplary screen display that may be presented by the graphical user interface.
Figure 11:
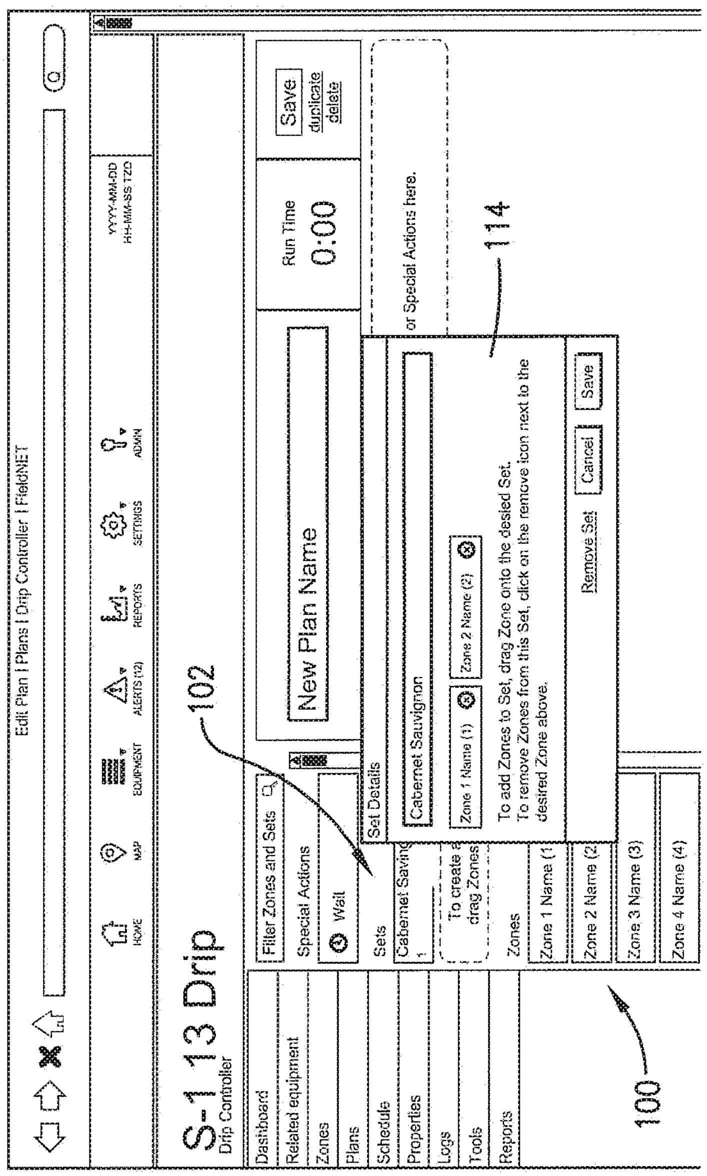
FIG. 11 is another exemplary screen display that may be presented by the graphical user interface.
Figure 12:
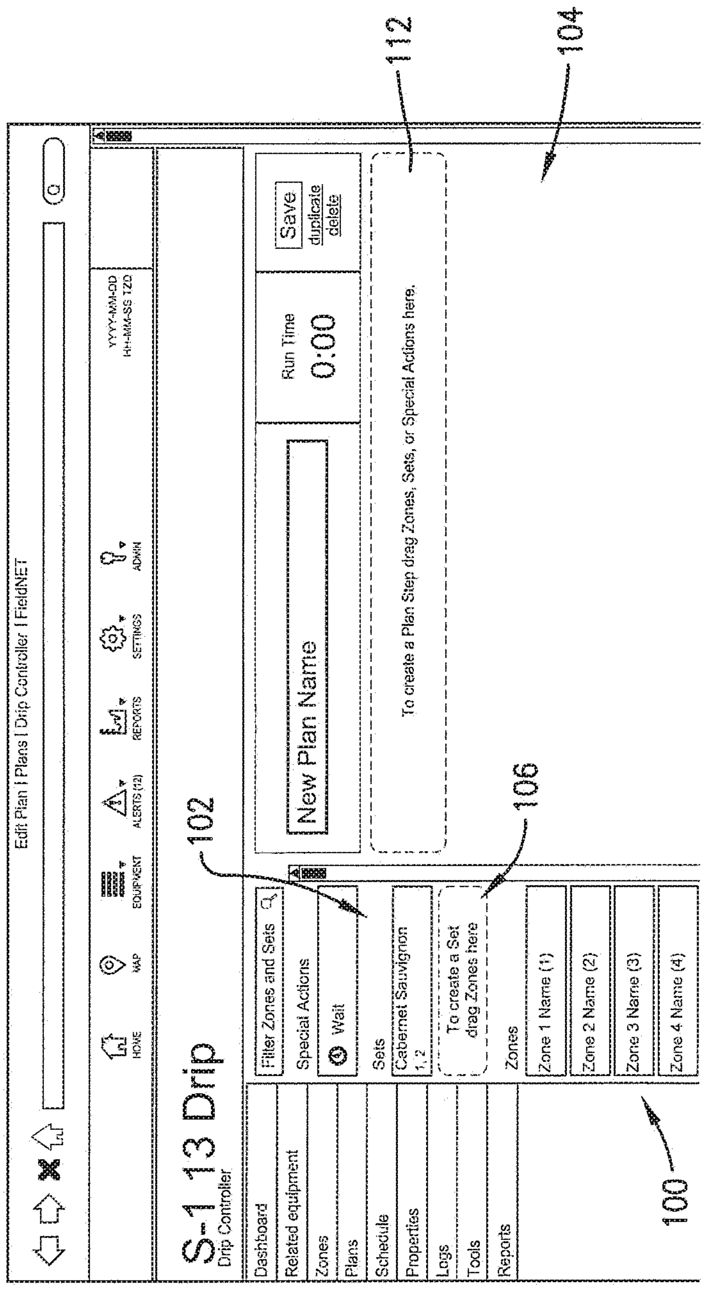
FIG. 12 is another exemplary screen display that may be presented by the graphical user interface.

The drag and drop functionality also permits a user to drag and drop an irrigation zone into an existing irrigation set listing. For example, as depicted in FIGS. 10 and 11, a user may click-on or otherwise select the listing for zone 2 from the zone list 100 and drag and drop it into the existing irrigation set listing called Cabernet Sauvignon. Upon releasing the zone listing in the existing irrigation set listing, the user interface again displays the dialog box 114 as depicted in FIG. 11 to show the zones in the irrigation set. Once the user selects the Save button in the dialog box 114, the graphical user interface shows the updated irrigation set listing as depicted in FIG. 12.

Figure 13:
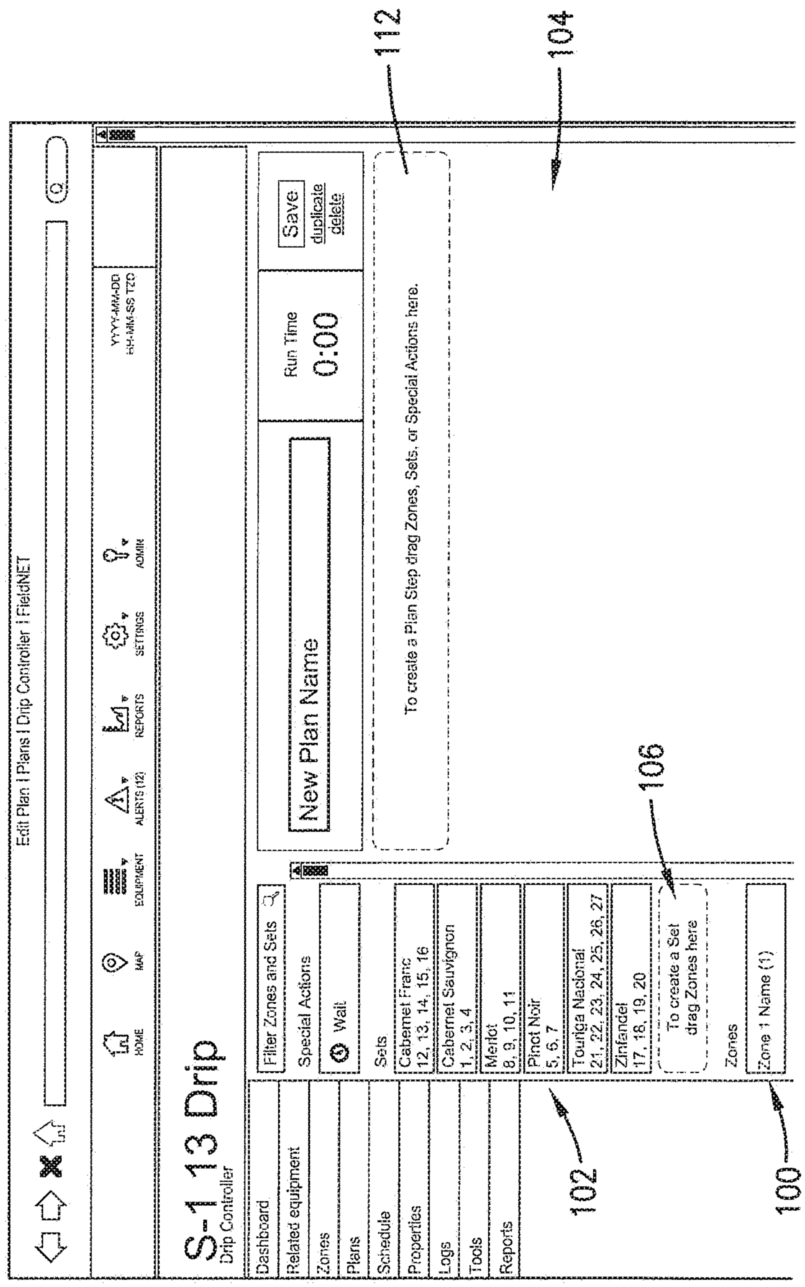
FIG. 13 is another exemplary screen display that may be presented by the graphical user interface.
Figure 14:
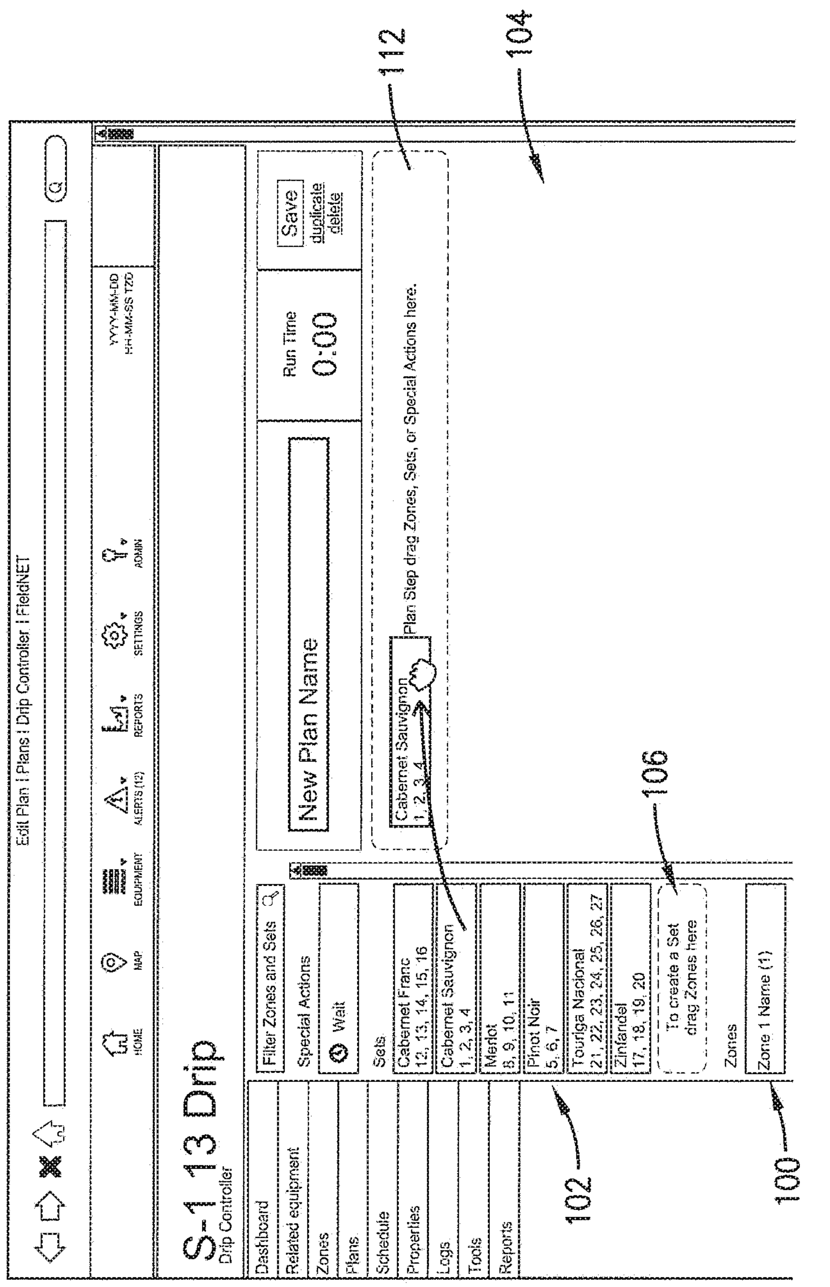
FIG. 14 is another exemplary screen display that may be presented by the graphical user interface.
Figure 15:
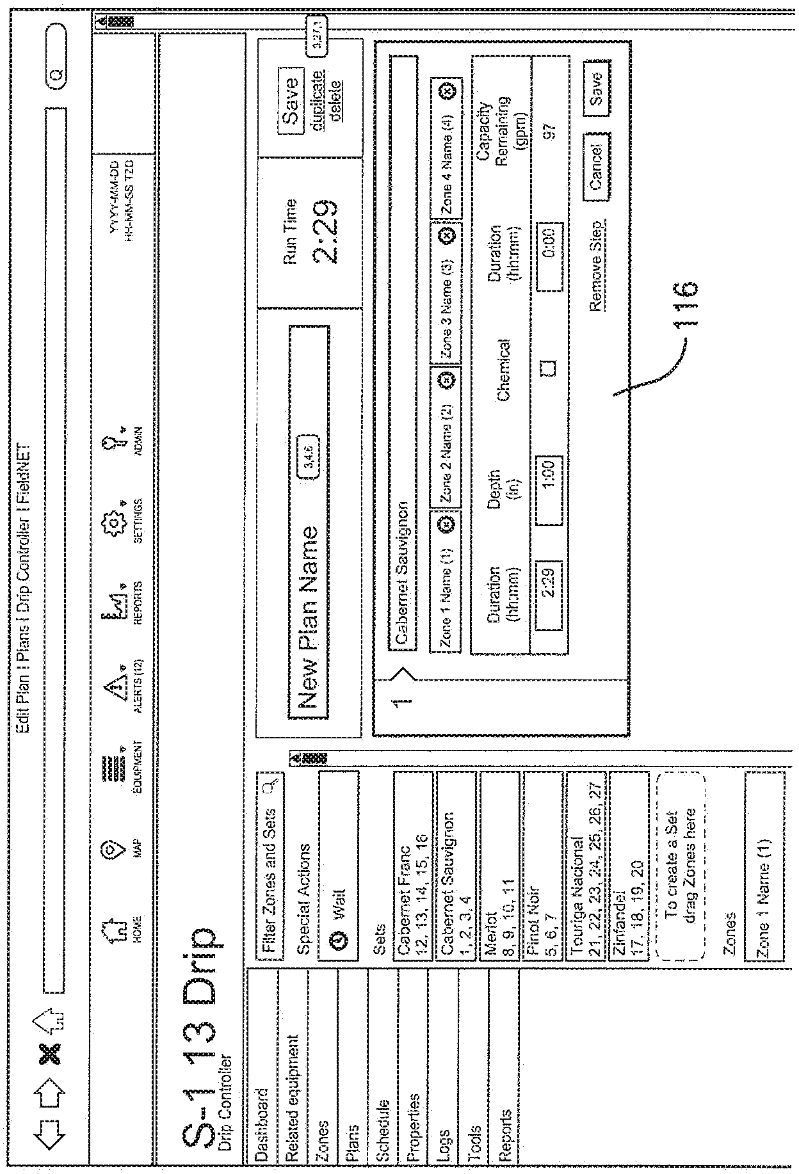
FIG. 15 is another exemplary screen display that may be presented by the graphical user interface.
Figure 16:
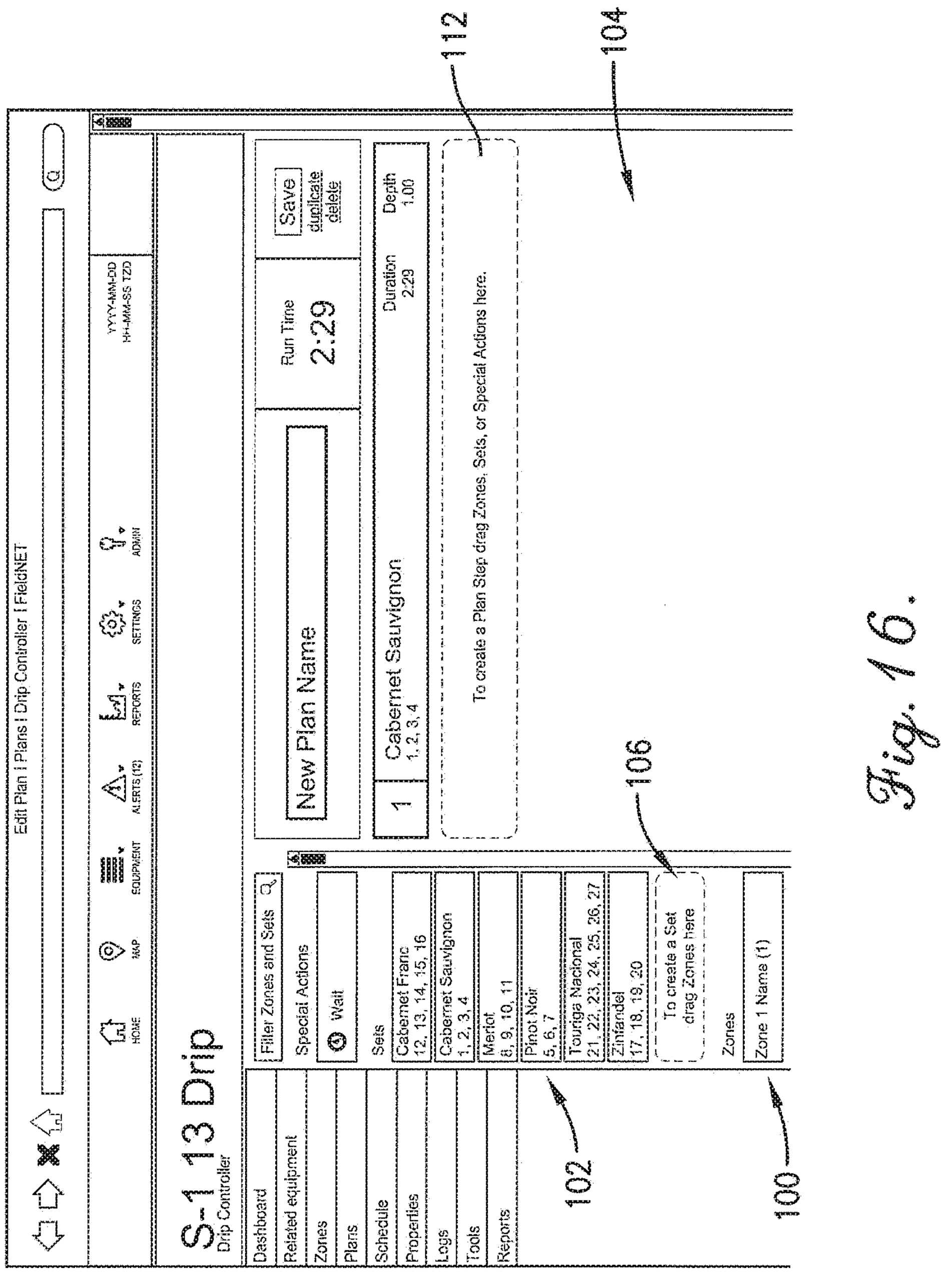
FIG. 16 is another exemplary screen display that may be presented by the graphical user interface.

The drag and drop functionality may also permit an irrigation zone listing, an irrigation set listing, or a special action to be dragged and dropped into the irrigation plan field 104 to create a new irrigation plan or modify an existing one. For example, as shown in FIGS. 13 and 14, a user may click-on or otherwise select the set listing called Sauvignon and drag and drop it to the drag and drop area 112 of the irrigation plan field 104 to create a step of a new irrigation plan. Upon releasing the irrigation set, the graphical user interface expands the dropped set listing in a dialog box 116 shown in FIG. 15 that enables the user to select the run time and/or watering depth for the irrigation set. The user may then save the irrigation set as a step in the irrigation plan, which causes the dialog box to compress as shown in FIG. 16. The graphical user interface also lists the accumulated run time of all the steps in a Run Time box as shown in FIGS. 15 and 16. In alternate embodiments, other user interface methods of copying information may be used instead of the drag and drop functionality.

Figure 17:
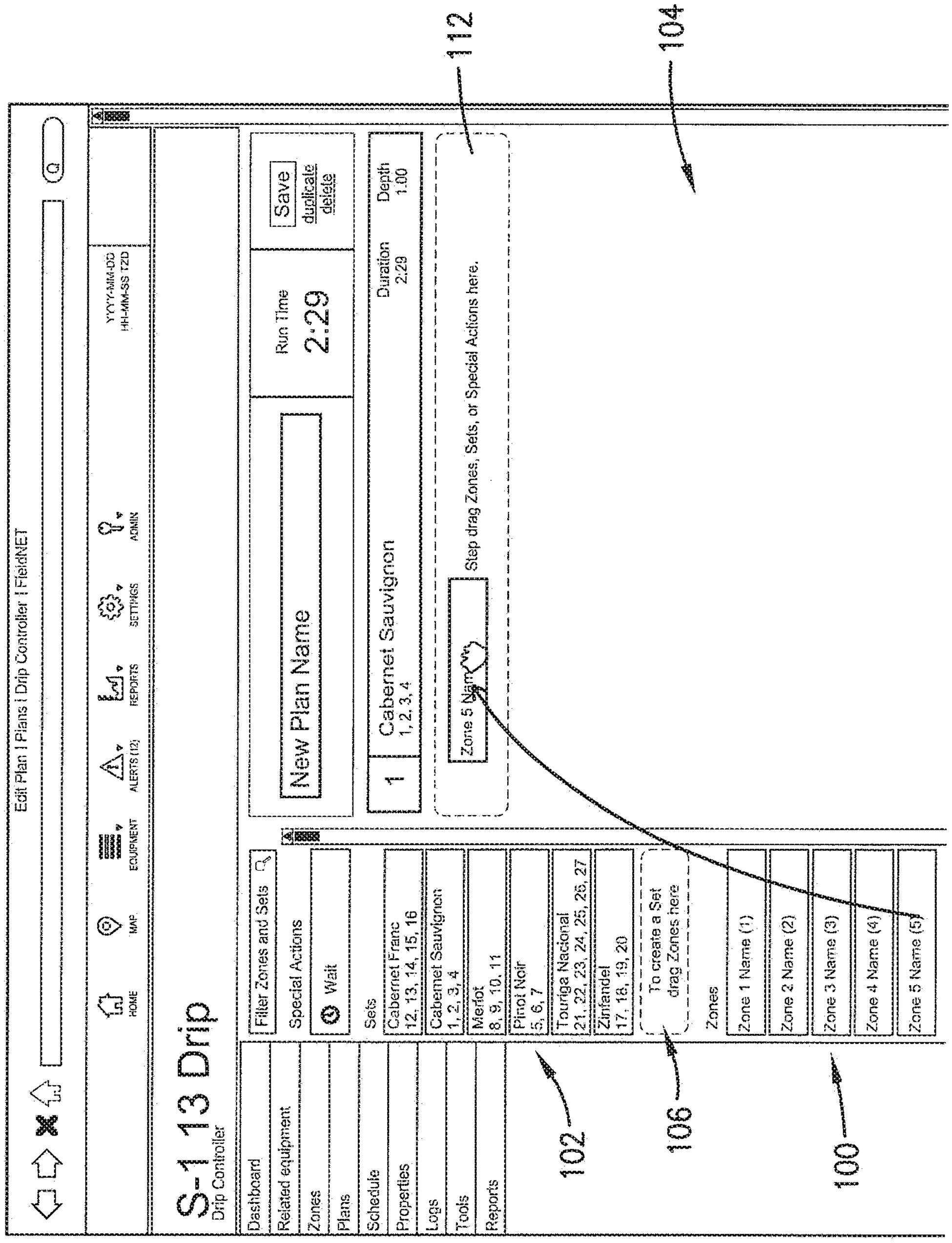
FIG. 17 is another exemplary screen display that may be presented by the graphical user interface.
Figure 18:
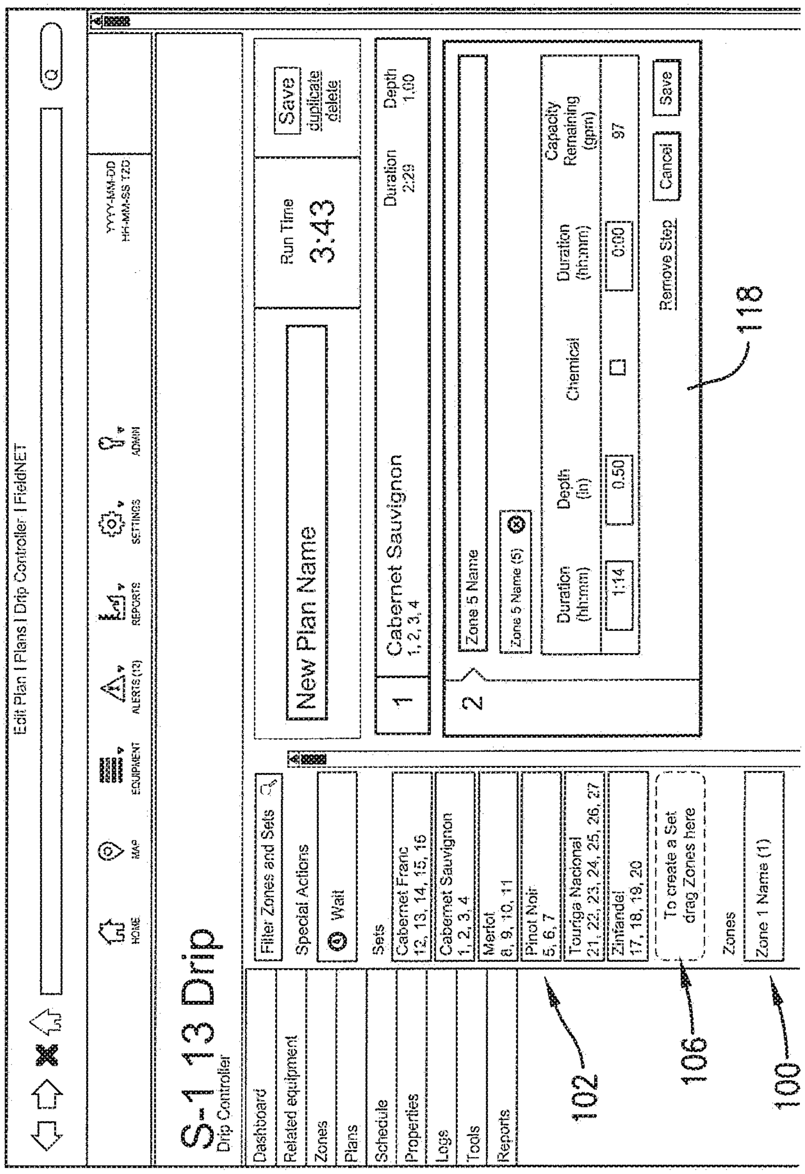
FIG. 18 is another exemplary screen display that may be presented by the graphical user interface.
Figure 19:
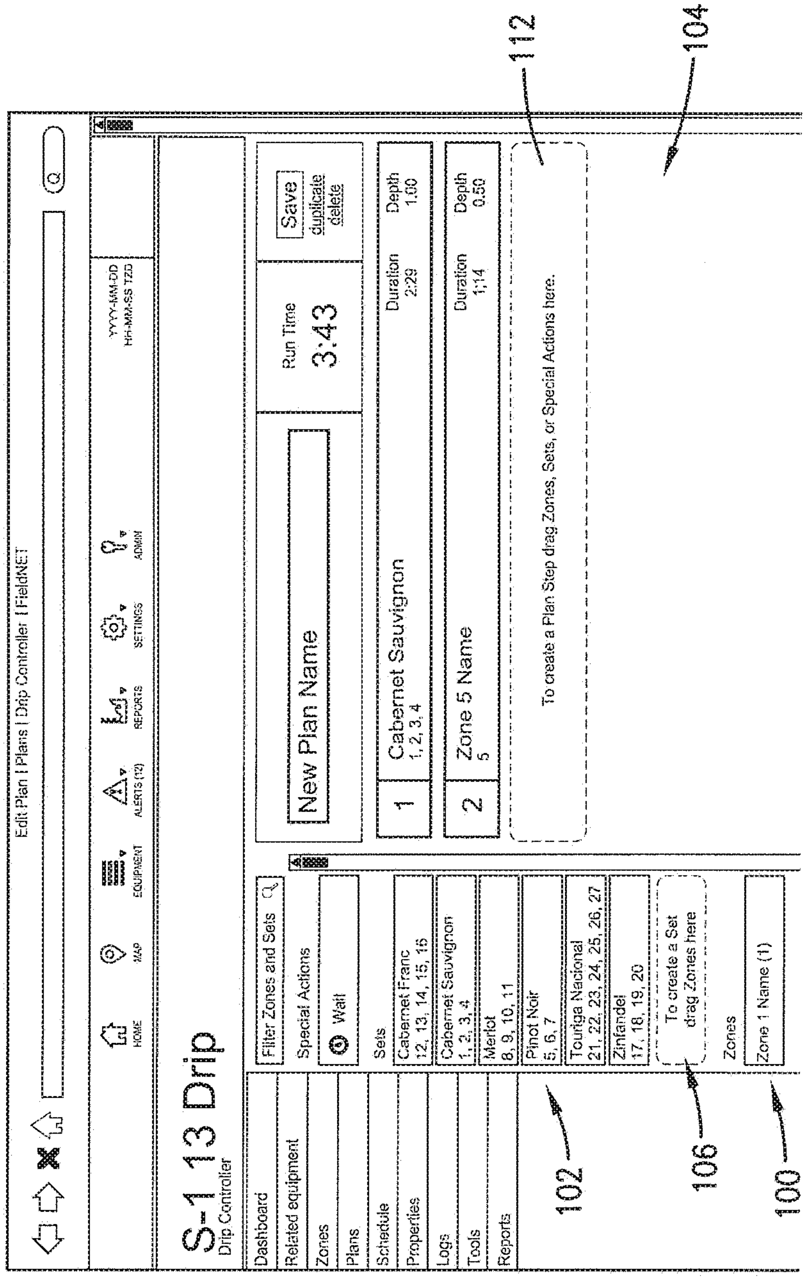
FIG. 19 is another exemplary screen display that may be presented by the graphical user interface.

Similarly, a user may click-on or otherwise select a zone listing and drag and drop it to the drag and drop area 112 of the irrigation plan field 104 to create another step of the irrigation plan as depicted in FIGS. 17 and 18. Again, upon releasing the zone listing, the graphical user expands the dropped listing in a dialog box 118 that enables the user to select the run time and/or watering depth for the step. The user may then save the plan step, which causes the step to compress as shown in FIG. 19 and updates the accumulated run time of all the steps in the Run Time box.

Figure 20:
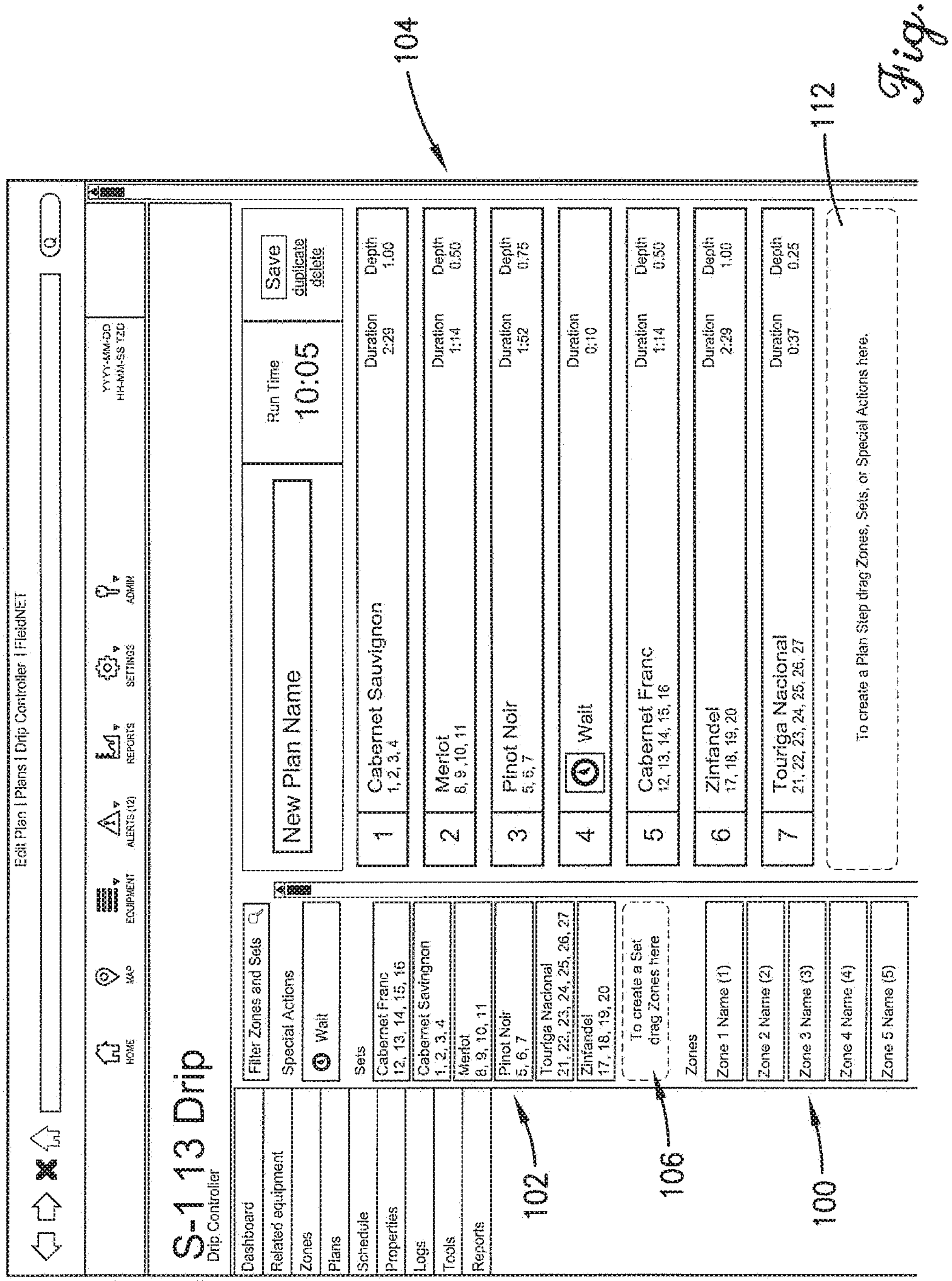
FIG. 20 is another exemplary screen display that may be presented by the graphical user interface.
Figure 21:
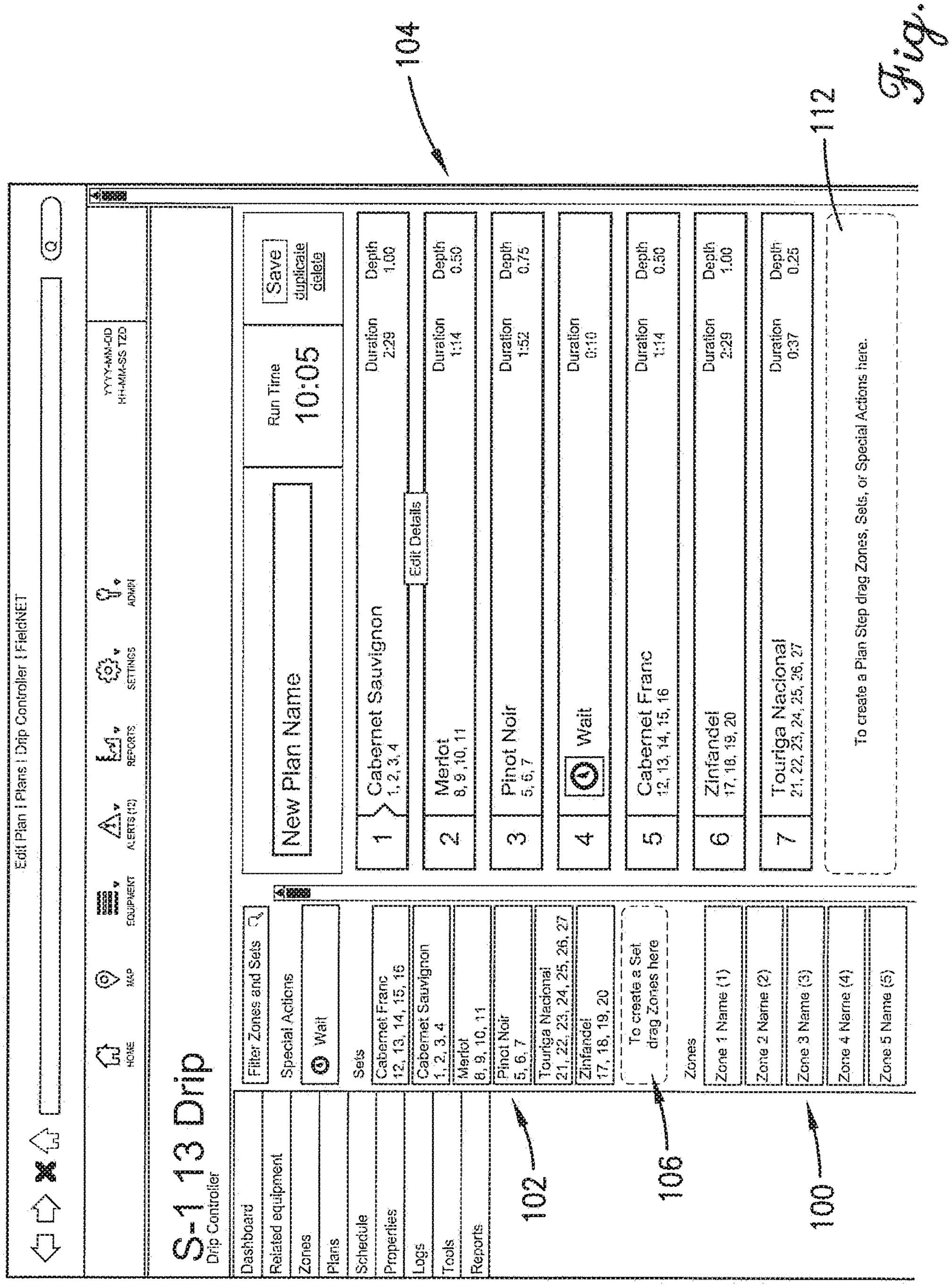
FIG. 21 is another exemplary screen display that may be presented by the graphical user interface.
Figure 22:
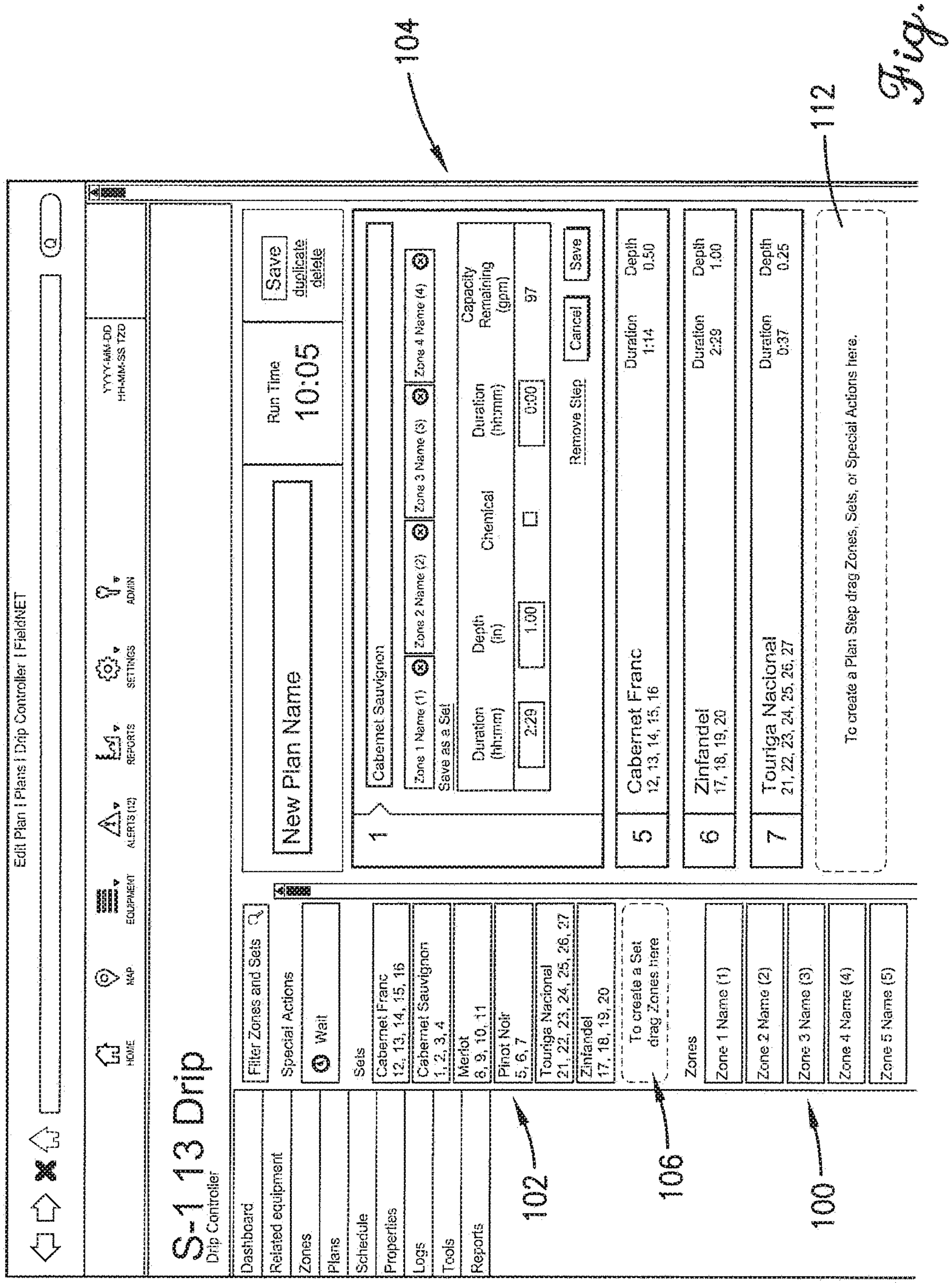
FIG. 22 is another exemplary screen display that may be presented by the graphical user interface.

FIG. 20 shows a completed irrigation plan with seven steps and a total run time of 10 minutes and 5 seconds. A step of an irrigation plan can be expanded to view and/or modify details of the step while or after the plan is created as shown in FIGS. 21 and 22.

Figure 23:
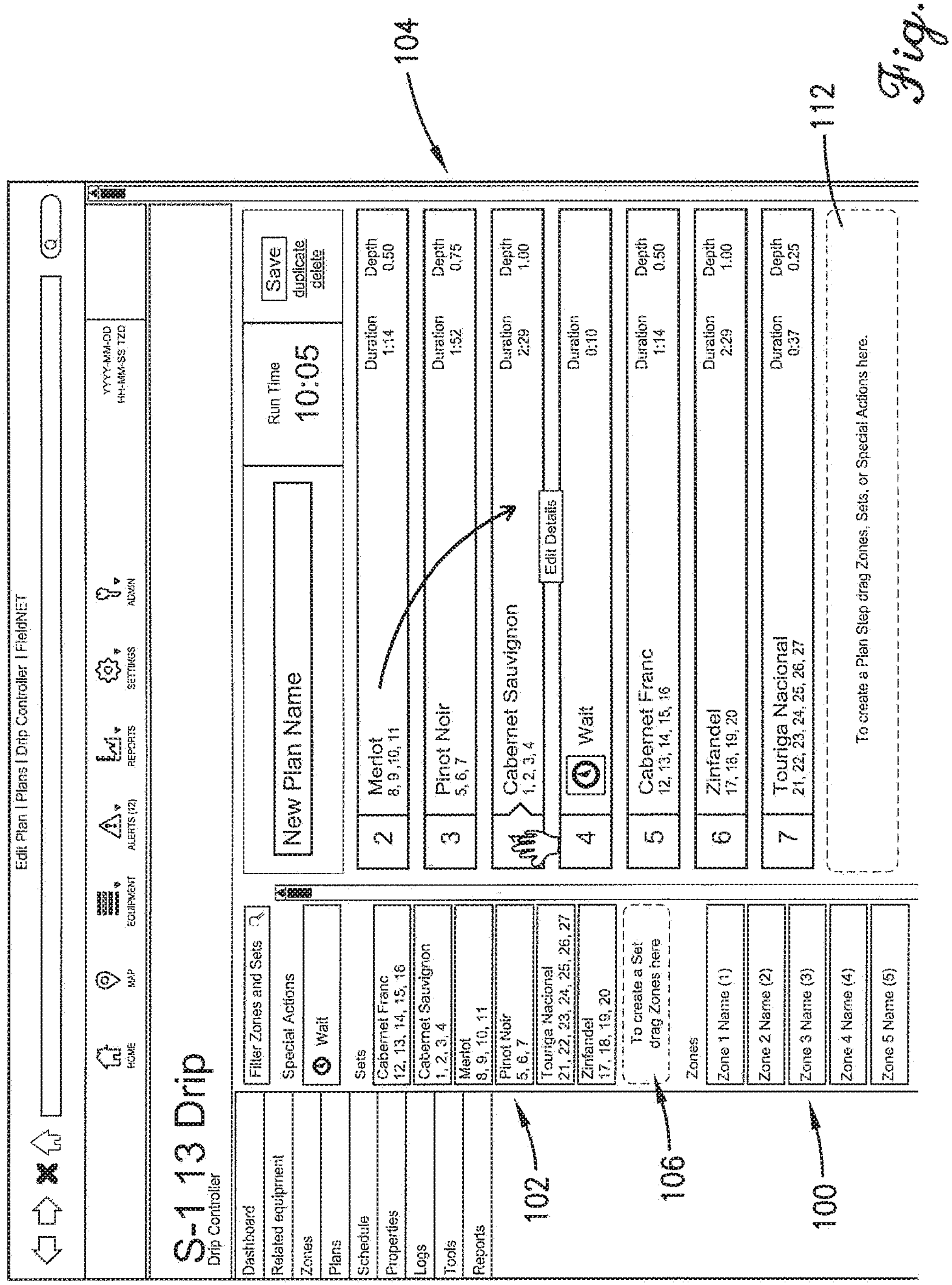
FIG. 23 is another exemplary screen display that may be presented by the graphical user interface.

The user interface 32 also allows a user to re-arrange the steps in an irrigation plan. For example, as shown in FIG. 23, a user may click-on or otherwise select a plan step and drag and drop it elsewhere in the irrigation plan to re-order the plan steps.

The above-described user interface 32 allows a user to quickly and easily create irrigation sets from irrigation zones and then view and/or modify the irrigation sets. The user can then drag the created irrigation sets, irrigation zone listings, and/or special action listings to anew or existing irrigation plan. These steps are intuitive and easy to implement, thus significantly reducing the time and experience needed to create custom irrigation plans.

Once an irrigation plan is created as described above, it may be pushed to or otherwise accessed by the irrigation system controller 30 and then implemented by the controller to operate the valves 24 in accordance with the irrigation plan. For example, in one embodiment, a user may access a calendar function supported by the user interface and select different irrigation plans to implement for different days of the week. The irrigation system controller may access the calendar and implement the irrigation plans as prescribed.

Although the invention has been described with reference to the exemplary embodiments illustrated in the attached drawings, it is noted that equivalents may be employed and substitutions made herein without departing from the scope of the invention as recited in the claims. For example, while the various components of the control system are illustrated and described herein as separate, interconnected components or elements, it will be appreciated that certain functions may be shared by two or more of the components. For example, the functions of the valve controllers and the irrigation system controller could be partially or completely combined and performed by one of the components. Or, the control system may be partially or completely implemented by one or more of the host computers or by circuitry or controllers associated with the irrigation system. Thus, the control system may be substantially centralized, or may be distributed across multiple systems and geographic areas.

Having thus described various embodiments of the invention, what is claimed as new and desired to be protected by Letters Patent includes the following:

1. A control system for controlling valves of an irrigation system via an irrigation system controller, each valve having a valve controller, the control system comprising:

a graphical user interface for allowing a user to interact with the irrigation controller and to create an irrigation plan, the graphical user interface comprising, on a single interactive page:

information for a number of irrigation zones, the information being in an irrigation set listing of an irrigation set list on the graphical user interface, the irrigation plan including the information for the irrigation zones;

an irrigation plan field displaying the irrigation plan to be implemented by the irrigation system controller; and an irrigation zone list containing a listing of irrigation zones of the irrigation system, each of the irrigation zones being configured to be controlled by one of the valve controllers;

functionality that permits an irrigation zone listing from the irrigation zone list to be copied into any of the irrigation set listings in the irrigation set list; and functionality that permits an irrigation zone listing or an irrigation set listing to be copied into the irrigation plan to create irrigation steps within the irrigation plan.

2. The control system of claim 1, further comprising:

drag and drop functionality that permits an irrigation zone listing from the irrigation zone list to be dragged and dropped into any of the irrigation set listings in the irrigation set list; and drag and drop functionality that permits an irrigation zone listing or an irrigation set listing to be dragged and dropped into the irrigation plan to create irrigation steps within the irrigation plan.

3. The control system of claim 2, wherein the drag and drop functionality associates data for an irrigation zone listing with an irrigation set listing when the irrigation zone listing is dragged and dropped into the irrigation set listing.

4. The control system of claim 2, wherein the drag and drop functionality associates data for an irrigation zone listing with the irrigation plan when the irrigation zone listing or an irrigation set listing containing the irrigation zone listing is dragged and dropped into the irrigation plan.

5. The control system of claim 1, further comprising communications equipment for communicating the irrigation plan from the graphical user interface to the irrigation system controller.

6. The control system of claim 1, further comprising communications equipment for communicating instructions in the irrigation plan from the irrigation system controller to the valve controllers.

7. The control system of claim 1, wherein the graphical user interface is remotely accessible.

8. The control system of claim 1, wherein the graphical user interface is configured to wirelessly communicate with a plurality of host computers including repositories for data and programs implemented by the graphical user interface.

9. The control system of claim 1, further comprising functionality for customizing run time parameters.

10. The control system of claim 1, further comprising functionality for adding completed irrigation plans to a calendar for scheduling operation of the irrigation system.

11. A control system for controlling valves of an irrigation system via an irrigation system controller, each valve having a valve controller, the control system comprising:

a graphical user interface accessible via mobile communication devices for allowing users to interact with the irrigation controller and to create the irrigation plan, the graphical user interface comprising, on a single interactive page:

an irrigation set list containing a listing of irrigation sets, each irrigation set listing containing information for an irrigation zone;

an irrigation zone list containing a listing of irrigation zones of the irrigation system, each of the irrigation zones being configured to be controlled by one of the valve controllers; and an irrigation plan field displaying the irrigation plan to be implemented by the irrigation system controller, the irrigation plan including information for at least one irrigation zone or at least one irrigation set, irrigation zone listings from the irrigation zone list being configured to be copied into any of the irrigation set listings in the irrigation set list, the irrigation zone listings and the irrigation set listings being configured to be copied into the irrigation plan to create irrigation steps within the irrigation plan, the irrigation set list existing separate from and outside of the irrigation plan field.

12. The control system of claim 11, further comprising:

drag and drop functionality that permits an irrigation zone listing from the irrigation zone list to be dragged and dropped into any of the irrigation set listings in the irrigation set list; and drag and drop functionality that permits an irrigation zone listing or an irrigation set listing to be dragged and dropped into the irrigation plan to create irrigation steps within the irrigation plan.

13. The control system of claim 12, wherein the drag and drop functionality associates data for an irrigation zone listing with an irrigation set listing when the irrigation zone listing is dragged and dropped into the irrigation set listing.

14. The control system of claim 12, wherein the drag and drop functionality associates data for an irrigation zone listing with the irrigation plan when the irrigation zone listing or an irrigation set listing containing the irrigation zone listing is dragged and dropped into the irrigation plan.

15. The control system of claim 11, further comprising communications equipment for communicating the irrigation plan from the graphical user interface to the irrigation system controller.

16. The control system of claim 11, further comprising communications equipment for communicating instructions in the irrigation plan from the irrigation system controller to the valve controllers.

17. The control system of claim 11, wherein the graphical user interface is remotely accessible.

18. The control system of claim 11, wherein the graphical user interface is configured to wirelessly communicate with a plurality of host computers including repositories for data and programs implemented by the graphical user interface.

19. The control system of claim 11, further comprising functionality for customizing run time parameters and functionality for adding completed irrigation plans to a calendar for scheduling operation of the irrigation system.

20. A control system for controlling valves of an irrigation system via an irrigation system controller, each valve having a valve controller, the control system comprising:

a remotely accessible graphical user interface for allowing a user to interact with the irrigation controller and to create an irrigation plan, the graphical user interface comprising, on a single interactive page:

information for a number of irrigation zones, the information being in an irrigation set listing of an irrigation set list on the graphical user interface, the irrigation plan including the information for the irrigation zones;

an irrigation plan field displaying the irrigation plan to be implemented by the irrigation system controller; and an irrigation zone list containing a listing of irrigation zones of the irrigation system, each of the irrigation zones being configured to be controlled by one of the valve controllers, the graphical user interface being configured to wirelessly communicate with a plurality of host computers including repositories for data and programs implemented by the graphical user interface;

drag and drop functionality that permits an irrigation zone listing from the irrigation zone list to be dragged and dropped into any of the irrigation set listings in the irrigation set list;

drag and drop functionality that permits an irrigation zone listing or an irrigation set listing to be dragged and dropped into the irrigation plan to create irrigation steps within the irrigation plan;

functionality for customizing run time parameters; and functionality for adding completed irrigation plans to a calendar for scheduling operation of the irrigation system.

* * * * *